US008631669B2

(12) United States Patent
Okada

(10) Patent No.: US 8,631,669 B2
(45) Date of Patent: Jan. 21, 2014

(54) OPTICAL FIBER MANUFACTURING APPARATUS AND OPTICAL FIBER MANUFACTURING METHOD

(75) Inventor: Kenji Okada, Sakura (JP)

(73) Assignee: Fujikura Ltd., Tokyo (JP)

( * ) Notice: Subject to any disclaimer, the term of this patent is extended or adjusted under 35 U.S.C. 154(b) by 182 days.

(21) Appl. No.: 13/090,693

(22) Filed: Apr. 20, 2011

(65) Prior Publication Data
US 2011/0265522 A1 Nov. 3, 2011

(30) Foreign Application Priority Data

Apr. 30, 2010 (JP) ................................ 2010-105216

(51) Int. Cl.
C03B 37/029 (2006.01)
(52) U.S. Cl.
USPC ............................................. 65/537; 65/424
(58) Field of Classification Search
USPC ........................................ 65/424, 477, 537
See application file for complete search history.

(56) References Cited

U.S. PATENT DOCUMENTS

| 6,543,257 B1 | 4/2003 | Koaizawa et al. |
| 2006/0280578 A1* | 12/2006 | Shiono .......................... 411/542 |
| 2009/0038345 A1* | 2/2009 | Otosaka et al. .................. 65/424 |

FOREIGN PATENT DOCUMENTS

| JP | 63-040738 A | 2/1988 |
| JP | 03-37128 A | 2/1991 |
| JP | 2005-225733 A | 8/2005 |
| JP | 2006-131427 A | 5/2006 |
| JP | 2006-248842 A | 9/2006 |
| JP | 2007070187 A | 3/2007 |
| JP | 2009-062265 A | 3/2009 |
| KR | 1020040097363 A | 11/2004 |
| KR | 1020050021451 A | 3/2005 |
| KR | 1020060007434 A | 1/2006 |
| KR | 1020080024428 A | 3/2008 |
| RU | 1838257 A3 | 8/1993 |
| WO | 8810241 A1 | 12/1988 |

OTHER PUBLICATIONS

Russian Office Action dated Jun. 4, 2012, in Application No. 2011116793.
Notice of Allowance issued by the Korean Patent Office in Korean Application No. 10-2011-0039619 dated Dec. 2, 2012.
Notice of Allowance issued by the Russian Patent Office in Russian Application No. 2011116793 dated Nov. 23, 2012.
Japanese Office Action dated Dec. 10, 2013, in Japanese Application No. 2010-105216.

* cited by examiner

Primary Examiner — Matthew Daniels
Assistant Examiner — Lisa Herring
(74) Attorney, Agent, or Firm — Sughrue Mion, PLLC

(57) ABSTRACT

An optical fiber manufacturing apparatus including: a heating furnace in which an optical fiber is formed by melt-drawing an optical fiber preform; a sealing mechanism which is provided on an opening portion located at an upstream of the heating furnace and seals the heating furnace with an inert gas; a first pipe which is connected to the heating furnace and introduces the gas into the heating furnace; a second pipe which is connected to a lowermost compartment closest to the heating furnace among the compartments and introduces the gas into the lowermost compartment; and a gas flow rate control unit which controls a total sum of a flow rate of a gas supplied from the first pipe into the heating furnace and a flow rate of a gas supplied from the second pipe into the lowermost compartment to be substantially constant.

5 Claims, 10 Drawing Sheets

OPTICAL FIBER MANUFACTURING APPARATUS AND OPTICAL FIBER MANUFACTURING METHOD

BACKGROUND OF THE INVENTION

1. Field of the Invention

The present invention relates to an optical fiber manufacturing apparatus and an optical fiber manufacturing method.

Priority is claimed on Japanese Patent Application No. 2010-105216, filed on Apr. 30, 2010, the contents of which are incorporated herein by reference.

2. Description of the Related Art

An optical fiber is manufactured in a manner such that a silica glass rod called an optical fiber preform supported in a suspended manner inside a heating furnace is moved down, a front end thereof is heat-melted while it is moved down, and the optical fiber is drawn from the melted portion. At this time, in the optical fiber preform, an end portion which is not used for the fiber drawing operation is used as a dummy portion, and the dummy portion is supported in a suspended manner. The optical fiber preform may be manufactured by a method such as VAD method, OVD method, MCVD method, PCVD method, or RIC method.

On the other hand, in the heating furnace performing a melt-drawing operation, generally, the internal temperature increases up to about 2000° C. For this reason, a carbon-based material having heat resistance is used as a member of an interior portion of the heating furnace. However, although the carbon-based member has heat resistance, the carbon-based member deteriorates due to oxidization since it is exposed to a high temperature under the presence of oxygen gas. In this case, the interior of the heating furnace is contaminated by soot or the like formed by oxidization. When the contaminated state is left as it is, the strength of the manufactured optical fiber may be degraded.

Therefore, in order to obtain the optical fiber with satisfactory quality, the interior of the heating furnace needs to be maintained under the presence of inert gases such as nitrogen, argon, and helium, and the atmosphere (external air) needs to be prevented from intruding into the heating furnace.

In order to prevent external air from intruding into the heating furnace, it becomes important to maintain air-tightness at an opening portion located at the upstream of the heating furnace while the optical fiber preform is inserted through the heating furnace. Then, at this time, a variation in the outer diameter of the optical fiber preform in the longitudinal direction particularly becomes a problem. More specifically, a difference in the outer diameter between the dummy portion of the optical fiber preform and the rest of the body portion used for the fiber drawing operation, and a variation in the outer diameter at the boundary area between the dummy portion and the body portion are considered problems. This is because the air-tightness between the optical fiber preform and the opening portion of the heating furnace is difficult to maintain while the optical fiber preform having an uneven outer diameter is moved (moved down) in the longitudinal direction thereof.

As a method of preventing external air from intruding into the heating furnace, Japanese Unexamined Patent Application, First Publication No. H3-37128 and Japanese Unexamined Patent Application, First Publication No. 2005-225733 disclose a method in which a chamber blocking an entire optical fiber preform from external air is disposed on an opening portion located at the upstream of the heating furnace. However, in such a method, since there is a need to further provide a higher space above the heating furnace, a problem arises in that a large optical fiber preform or a high-speed fiber drawing speed is difficult to handle. Further, when the stream of a gas locally changes greatly inside the heating furnace, a problem arises in that the outer diameter of the optical fiber changes. However, in the existing method, no consideration is made to solve such a problem.

On the other hand, Japanese Unexamined Patent Application, First Publication No. 2009-62265 and Japanese Unexamined Patent Application, First Publication No. 2006-248842 discloses a method in which a seal member is provided on the opening portion located at the upstream of the heating furnace to contact the outer peripheral surface of the optical fiber preform, so that external air is prevented from intruding into the heating furnace.

However, in the method disclosed in Japanese Unexamined Patent Application, First Publication No. 2009-62265 and Japanese Unexamined Patent Application, First Publication No. 2006-248842, there is a process of introducing an inert gas into the heating furnace while the optical fiber preform is moved down so that the melted optical fiber of the optical fiber preform is drawn. In such a process, since the stream of the gas locally changes greatly inside the heating furnace interior as described above, a problem arises in that the outer diameter of the optical fiber changes. Further, in the method disclosed in Japanese Unexamined Patent Application, First Publication No. 2006-248842, when the optical fiber preform having an uneven outer diameter is moved down, it is difficult to maintain air-tightness. Accordingly, external air intrudes into the heating furnace, so that the stream of the gas locally changes greatly or the gas is mixed with oxygen, thereby causing a problem in that the carbon-based member deteriorates.

The present invention is made in view of such circumstances, and provides an optical fiber manufacturing apparatus and an optical fiber manufacturing method capable of preventing external air from intruding into a heating furnace and preventing a large variation in the local stream of a gas in the heating furnace.

SUMMARY OF THE INVENTION

According to a first aspect of the present invention, there is provided an optical fiber manufacturing apparatus including: a heating furnace in which an optical fiber is formed by melt-drawing an optical fiber preform having a dummy portion provided at an end portion thereof while the optical fiber preform is moved in a longitudinal direction thereof; a sealing mechanism which is provided on an opening portion located at an upstream of the heating furnace, includes three or more seal members contacting an outer peripheral surface of the optical fiber preform and dividing an internal space into three or more compartments along the longitudinal direction of the optical fiber preform, and seals the heating furnace with an inert gas by preventing external air from intruding into the heating furnace while the optical fiber preform is inserted through the heating furnace; a first pipe which is connected to the heating furnace and introduces the gas into the heating furnace; a second pipe which is connected to a lowermost compartment closest to the heating furnace among the compartments and introduces the gas into the lowermost compartment; and a gas flow rate control unit which controls a total sum of a flow rate of a gas supplied from the first pipe into the heating furnace and a flow rate of a gas supplied from the second pipe into the lowermost compartment to be substantially constant.

The optical fiber manufacturing apparatus may further include: a substantially cylindrical adapter which is attached to cover a contraction portion having an outer diameter reduced more than that of a body of the optical fiber preform and having a changing reduction width in the dummy portion of the optical fiber preform, wherein the adapter may include a first opening portion provided at an upstream of the optical fiber preform to come into close contact with an outer peripheral surface of the dummy portion, a second opening portion provided at a downstream of the optical fiber preform to come into close contact with the contraction portion, and an attachment portion covering the contraction portion, and seals at least a part of the contraction portion, and wherein an outer diameter of the attachment portion may be substantially equal to an outer diameter of the optical fiber preform.

The first pipe and the second pipe may be branched from one main pipe, and the gas flow rate control unit may include a gas supply source which supplies the gas to the main pipe.

According to a second aspect of the present invention, there is provided an optical fiber manufacturing apparatus including: a heating furnace in which an optical fiber is formed by melt-drawing an optical fiber preform having a dummy portion provided at an end portion thereof while the optical fiber preform is moved in a longitudinal direction thereof; a sealing mechanism which is provided on an opening portion located at an upstream of the heating furnace, includes two or more seal members contacting an outer peripheral surface of the optical fiber preform and dividing an internal space into two or more compartments along the longitudinal direction of the optical fiber preform, and seals the heating furnace with an inert gas by preventing external air from intruding into the heating furnace while the optical fiber preform is inserted through the heating furnace; a first pipe which is connected to the heating furnace and introduces the gas into the heating furnace; a second pipe which is connected to a lowermost compartment closest to the heating furnace among the compartments and introduces the gas into the lowermost compartment; a third pipe which is connected to an uppermost compartment among the compartments, the uppermost compartment being farthest from the heating furnace, having an opening portion coming into close contact with an outer peripheral surface of the dummy portion and located at an upstream, and sealing a contraction portion having an outer diameter reduced more than that of a body of the optical fiber preform in the dummy portion and having a changing reduction width when the optical fiber preform is inserted therethrough; and a gas flow rate control unit which controls a total sum of a flow rate of the gas supplied from the first pipe into the heating furnace, a flow rate of a gas supplied from the second pipe into the lowermost compartment, and a flow rate of a gas supplied from the third pipe into the uppermost compartment to be substantially constant.

The sealing mechanism may include three or more seal members dividing an internal space of the sealing mechanism into three or more compartments. The uppermost compartment may be independently attachable to or detachable from a portion other than the uppermost compartment of the sealing mechanism and may be movable along the longitudinal direction of the optical fiber preform by a driving device.

The first pipe, the second pipe, and the third pipe may be branched from one main pipe, and the gas flow rate control unit may include a gas supply source which supplies the gas to the main pipe.

According to a third aspect of the present invention, there is provided an optical fiber manufacturing method using an optical fiber manufacturing apparatus including a heating furnace in which an optical fiber is formed by melt-drawing an optical fiber preform having a dummy portion provided at an end portion thereof while the optical fiber preform is moved in a longitudinal direction thereof, and a sealing mechanism which is provided on an opening portion located at an upstream of the heating furnace, includes three or more seal members contacting an outer peripheral surface of the optical fiber preform and dividing an internal space into three or more compartments along the longitudinal direction of the optical fiber preform, and seals the heating furnace with an inert gas by preventing external air from intruding into the heating furnace while the optical fiber preform is inserted through the heating furnace, the optical fiber manufacturing method including: preparing an optical fiber preform having a dummy portion with a contraction portion having an outer diameter reduced more than that of a body and a changing reduction width; supplying an inert gas to a lowermost compartment closest to the heating furnace among the compartments and into the heating furnace; controlling a total sum of flow rates of the supplied inert gases to be substantially constant; and moving the optical fiber preform so that the contraction portion does not simultaneously meet all compartments from an uppermost compartment farthest from the heating furnace among the compartments to the lowermost compartment.

At least a part of the contraction portion may be sealed by attaching a substantially cylindrical adapter to the optical fiber preform to cover the contraction portion, the adapter including a first opening portion provided at an upstream to come into close contact with an outer peripheral surface of the dummy portion and a second opening portion provided at a downstream to come into close contact with the contraction portion. An outer diameter of an attachment portion of the adapter may be substantially equal to an outer diameter of the optical fiber preform. The optical fiber preform may be moved so that a non-attachment portion of the adapter in the contraction portion does not simultaneously meet all compartments from the uppermost compartment to the lowermost compartment.

The adapter may include a flange portion provided at one end thereof. The flange portion may be provided with an opening portion located at the upstream. The flange portion may cover and block an upper opening portion of the sealing mechanism while the optical fiber preform is inserted through the adapter. When the optical fiber preform having the adapter attached thereto is moved to block the upper opening portion of the sealing mechanism, the optical fiber preform may be further moved so that a non-attachment portion of the adapter in the contraction portion does not simultaneously meet the lowermost compartment and the compartment thereabove.

A distance between the adjacent seal members may be set to be longer than a length of the contraction portion in the longitudinal direction of the optical fiber preform.

According to a fourth aspect of the present invention, there is provided an optical fiber manufacturing method using an optical fiber manufacturing apparatus including a heating furnace in which an optical fiber is formed by melt-drawing an optical fiber preform having a dummy portion provided at an end portion thereof, while the optical fiber preform is moved in a longitudinal direction thereof, and a sealing mechanism which is provided on an opening portion located at an upstream of the heating furnace, includes two or more seal members contacting an outer peripheral surface of the optical fiber preform and dividing an internal space into two or more compartments along the longitudinal direction of the optical fiber preform, and seals the heating furnace with an inert gas by preventing external air from intruding into the heating furnace while the optical fiber preform is inserted through the heating furnace, the optical fiber manufacturing method including: preparing an optical fiber preform having a dummy portion with a contraction portion having an outer diameter reduced more than that of a body and a changing reduction width; and supplying an inert gas to a lowermost compartment closest to the heating furnace among the compartments and into the heating furnace and an uppermost compartment having an opening portion provided at the upstream to come into close contact with an outer peripheral surface of the dummy portion and sealing the contraction portion when the optical fiber preform is inserted therethrough, and moving the optical fiber preform while controlling a total sum of flow rates of the inert gases to be substantially constant.

The sealing mechanism may include three or more seal members which divide an internal space thereof into three or more compartments. The uppermost compartment may be independently attachable to or detachable from a portion other than the uppermost compartment of the sealing mechanism and may be movable along the longitudinal direction of the optical fiber preform by a driving device. When a fiber drawing operation is performed, the contraction portion and the body may be disposed such that the contraction portion is disposed at the uppermost compartment and the body of the optical fiber preform is disposed inside the heating furnace while the uppermost compartment is separated from a portion other than the uppermost compartment of the sealing mechanism, the uppermost compartment may be moved together with the optical fiber preform to be fixed to the other portion of the sealing mechanism, and then the optical fiber preform may be further moved.

According to the optical fiber manufacturing apparatus and the optical fiber manufacturing method, in the optical fiber manufacturing process, it is possible to prevent external air from intruding into the heating furnace and to prevent a large variation in the local stream of the gas inside the heating furnace. As a result, it is possible to prevent a variation in the outer diameter of the optical fiber, to prevent a deterioration of a carbon-based member inside the heating furnace, and to prevent a degradation of the strength of the optical fiber.

DETAILED DESCRIPTION OF THE INVENTION

<Optical fiber Manufacturing Apparatus and Optical fiber Manufacturing Method>
(First Embodiment)

Figure 1:
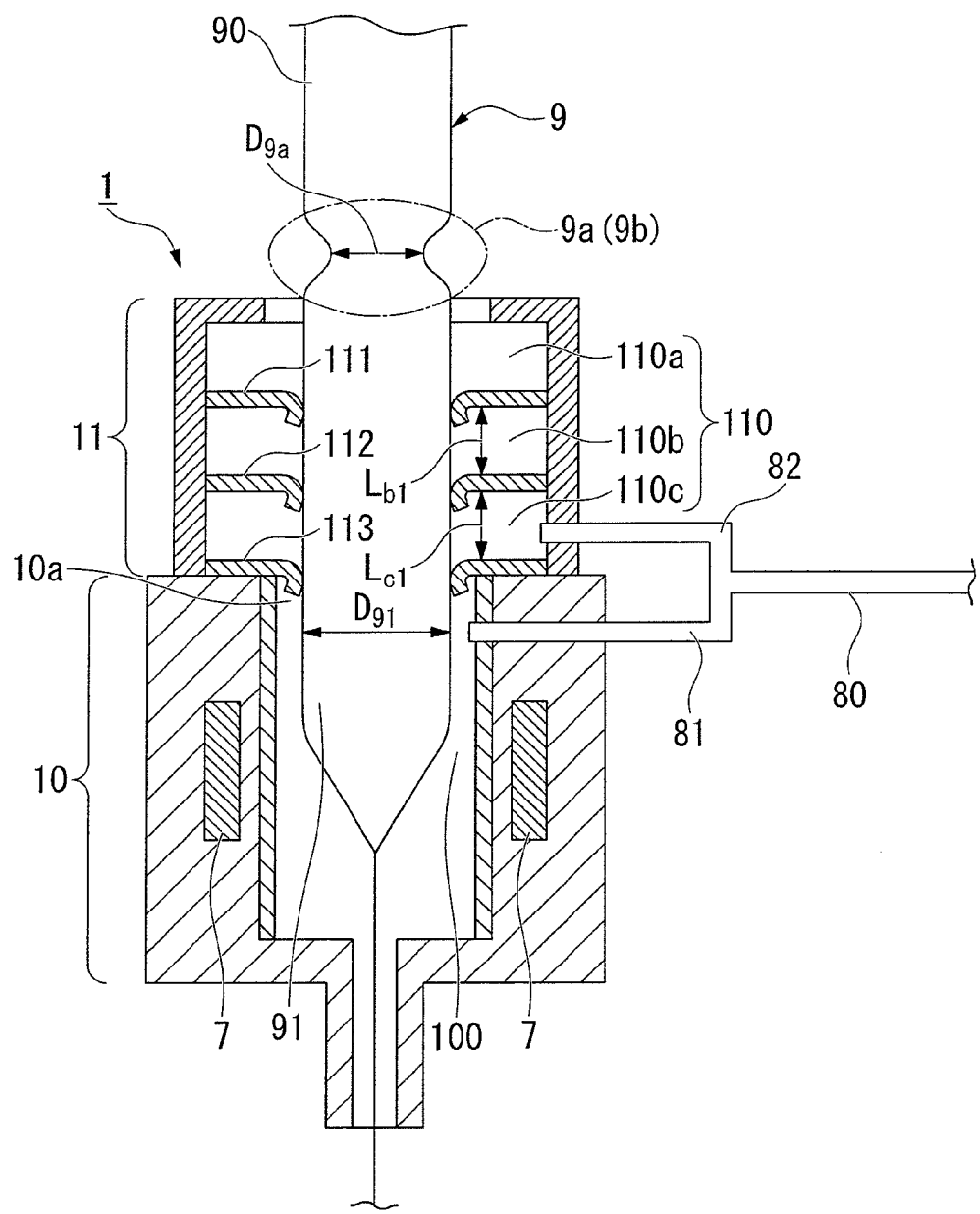
FIG. 1 is a front view illustrating a main part of a manufacturing apparatus according to a first embodiment of the present invention.

FIG. 1 is a front view illustrating a main part of a manufacturing apparatus according to a first embodiment of the present invention.

Further, in FIG. 1, the cross-sections of a heating furnace and a sealing device are shown. Regarding a manufacturing apparatus shown in FIGS. 2 to 11, the cross-sections of the heating furnace and the sealing device are shown.

A manufacturing apparatus 1 includes a heating furnace 10 in which an optical fiber is formed by melt-drawing an optical fiber preform, and a sealing device 11 which is provided on an opening portion 10a located at the upstream side of the heating furnace 10. Further, a first pipe 81 is connected to the heating furnace 10 to introduce a gas thereinto. A second pipe 82 is connected to the sealing device 11 to introduce a gas thereinto. The heating furnace 10 includes a heater 7 which is used to heat an optical fiber preform 9.

FIG. 1 illustrates a state where the optical fiber preform 9 is inserted through both the heating furnace 10 and the sealing device 11 of the manufacturing apparatus 1. The optical fiber preform 9 includes a body portion 91 which is melt-drawn to be formed as the optical fiber and a dummy portion 90 which is provided at the end portion of the body portion 91. In the optical fiber preform 9, a portion having an outer diameter smaller than that of the body portion 91 may be used as the dummy portion 90 when the optical fiber preform is manufactured. Further, a structure may be adopted in which the dummy member is separately melt-bonded to the body member and the end portion of the body portion 91 has the dummy portion 90.

In the optical fiber preform 9, the outer diameter $D_{91}$ of the body portion 91 is substantially constant in the longitudinal direction of the body portion except for the front end portion to be melt-drawn. Here, "the outer diameter $D_{91}$ is substantially constant" indicates that the range of a variation in the outer diameter $D_{91}$ is greater than or equal to about −5 mm and less than or equal to about +5 mm when, for example, the outer diameter $D_{91}$ is within the range greater than or equal to about 100 mm and less than or equal to about 200 mm.

Figure 2:
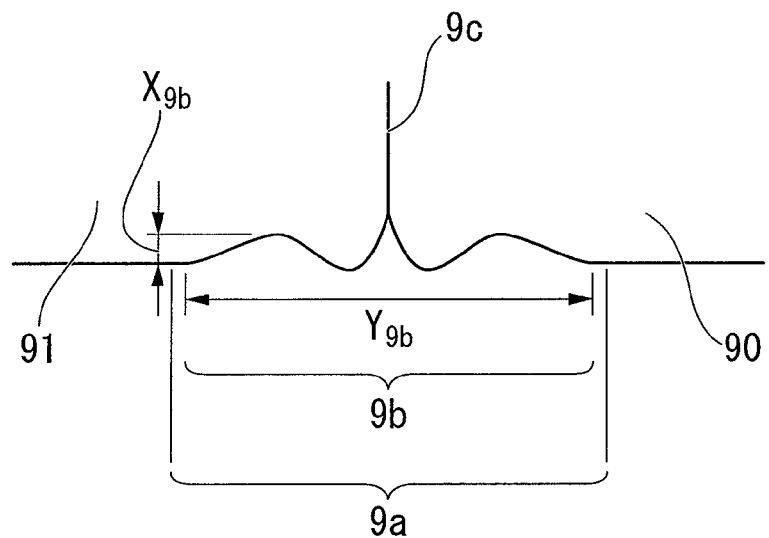
FIG. 2 is an enlarged diagram illustrating a portion close to a boundary between a dummy portion and a body portion of an optical fiber preform.

On the other hand, in the boundary area $9a$ between the dummy portion 90 and the body portion 91, the outer diameter $D_{9a}$ is contracted more than the outer diameter $D_{91}$ of the body portion 91, and the boundary portion has a contraction portion in which the reduction width changes. FIG. 2 is an enlarged diagram illustrating a portion close to the boundary portion $9a$ of the optical fiber preform 9. Here, only the surface of the boundary area $9a$ is shown. Further, in FIG. 1, the reduction width is emphasized in order to make the contraction portion in the boundary area $9a$ easy to recognize.

The optical fiber preform 9 is provided with the dummy portion 90 which is formed by melt-bonding a dummy member to a body member. The position of the boundary area $9a$ substantially matches the position of a flame contact portion of a burner. Then, in the longitudinal direction of the optical fiber preform 9, a melt-bonding portion $9c$ and front and rear areas thereof are formed as the contraction portion $9b$. The maximum value of a difference $X_{9b}$ (reduction width) between the outer diameter $D_{91}$ and the outer diameter $D_{9a}$ is, for example, greater than or equal to about 0.2 mm and less than or equal to about 0.8 mm, but the invention is not limited thereto. The length of the contraction portion $9b$ in the longitudinal direction of the optical fiber preform 9 is $Y_{9b}$.

Further, here, the optical fiber preform formed by melt-bonding the dummy portion 90 is described. However, the contraction portion is also provided in an optical fiber preform in which a portion having an outer diameter smaller than that of the body portion 91 when manufacturing the optical fiber preform 9 is formed as the dummy portion 90.

Further, in FIG. 2, a case is shown in which the boundary area $9a$ has both portions having the outer diameter $D_{9a}$ smaller and those not smaller than the outer diameter $D_{91}$ of the body portion 91. However, for example, the outer diameter $D_{9a}$ may gradually decrease toward an end portion opposite to the boundary area $9a$ of the dummy portion 90. The optical fiber preform 9 as the target of the present invention is not particularly limited as long as the contraction portion is provided therein.

The sealing device 11 has a function of preventing external air from intruding into a heating furnace interior 100 while the optical fiber preform 9 is inserted through an internal space 110 (hereinafter, simply referred to as a sealing device interior 110) and an internal space 100 (hereinafter, simply referred to as the heating furnace interior 100) of the heating furnace 10.

The sealing device 11 has a substantially cylindrical shape, and the inner surface thereof is provided with a first seal member 111, a second seal member 112, and a third seal member 113 which are formed thereon in a protruding manner. Then, through the three seal members contacting the outer peripheral surface of the body portion 91 while the optical fiber preform 9 is inserted through the sealing device interior 110, the sealing device interior 110 is divided into three compartments, that is, a first compartment 110a, a second compartment 110b, and a third compartment 110c along the longitudinal direction (the axial direction) of the optical fiber preform 9. Further, here, in order to make the present invention easier to understand, the thickness of the seal member is emphasized thickened compared to reality. The same applies to the drawings to be described later.

In the sealing device 11, a portion other than the first to third seal members is made of, for example, a material such as stainless steel.

The distance $L_{b1}$ between the first seal member 111 and the second seal member 112 and the distance $L_{c1}$ between the second seal member 112 and the third seal member 113 are both longer than the length $Y_{9b}$ of the contraction portion $9b$.

It is desirable that an error in the volume of the second compartment 110b and the third compartment 110c is within 10%, and more desirable that the volumes are substantially identical to each other. The volume of the first compartment 110a may be larger or smaller than the volume of the second compartment 110b or the third compartment 110c, but it is desirable that the volume of the first compartment 110a matches the volumes of the second compartment 110b and the third compartment 110c.

Figure 3:
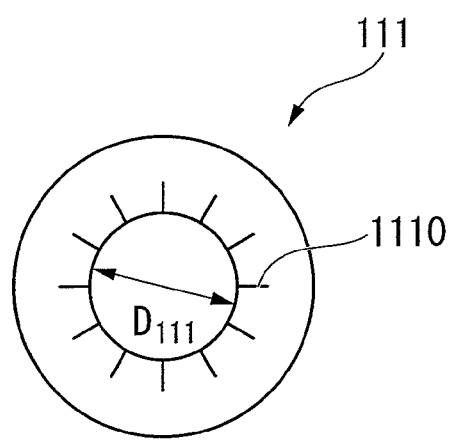
FIG. 3 is a plan view illustrating a first seal member (a second seal member and a third seal member) of the manufacturing apparatus of the embodiment.

The plan view of the first seal member 111 is shown in FIG. 3.

The first seal member 111 is a substantially annular sheet having a predetermined thickness and is formed of a material having heat resistance and flexibility. Examples thereof may include carbon, carbon felt, and the like.

The sheet forming the first seal member 111 is provided with a plurality of cleaved portions 1110 which is radially formed outward in the radial direction from the inner peripheral portion which serves as contact portions contacting the outer peripheral surface of the optical fiber preform 9. It is desirable that the cleaved portions 1110 are provided at substantially the same intervals. By providing the cleaved portions 1110 in this manner, when the first seal member 111 contacts the outer peripheral surface of the optical fiber preform 9, a gap may be more easily prevented from being formed between the outer peripheral surface and the first seal member 111. The number of cleaved portions may be appropriately adjusted in accordance with the diameter $D_{111}$ of the hole.

Further, the seal member may be formed of a sheet without the cleaved portions. However, when the cleaved portions are provided, the flexibility of the sheet improves, and a gap may be more easily prevented from being formed therebetween.

In the sheet forming the first seal member 111, it is desirable that the diameter $D_{111}$ of a hole allowing the optical fiber preform 9 to be inserted therethrough is slightly smaller than the outer diameter $D_{91}$ of the body portion 91 of the optical fiber preform 9, and more desirable that the diameter $D_{111}$ is smaller than the diameter $D_{91}$ by about 5 mm at maximum.

When the diameter $D_{111}$ is set in this manner, the optical fiber preform 9 may be more easily moved, and a gap may be more easily prevented from being formed between the outer peripheral surface of the optical fiber preform 9 and the first seal member 111.

Particularly, in the embodiment, it is desirable that the first seal member 111 is bent so that the upper surface thereof (the surface facing upward when the optical fiber preform 9 is not inserted) contacts the outer peripheral surface of the optical fiber preform 9 when the optical fiber preform 9 is inserted through the sealing device 11 as shown in FIG. 1 and the like. In this way, when the first seal member 111 and the outer peripheral surface of the optical fiber preform 9 are set to come into surface-contact with each other, the degree of adhesion improves, and a gap may be more effectively prevented from being formed therebetween.

The thickness of one sheet is not particularly limited, but it is desirable that the thickness is greater than or equal to 0.1 mm and less than or equal to 1 mm. When the thickness is set to the minimum value or more, the sheet has satisfactory flexibility, and a gap may be more easily prevented from being formed between the outer peripheral surface of the optical fiber preform 9 and the sheet. Further, when the thickness is set to the maximum value or less, the sheet has satisfactory flexibility, and the optical fiber preform 9 may be more easily moved while preventing the breakage thereof.

The first seal member 111 may be formed of one sheet or two or more stacked sheets. When two or more sheets are stacked, the types of sheets may be the same, a part of them may be different, or all of them may be different. Here, the fact that the types of sheets are different from each other indicates, for example, that one or more of the material of the sheet, the shape of the sheet, and the number of the cleaved portions are different from each other. Then, the positions of the cleaved portions of the sheets may match each other, partially match each other, or all not match each other.

It is desirable that the first seal member 111 is formed by stacking a plurality of sheets, and more desirable that two to four sheets are stacked so that the positions of the cleaved portions are deviated from each other. When the sheet is formed in this manner, a gap may be more easily prevented from being formed between the outer peripheral surface of the optical fiber preform 9 and the first seal member 111, and the optical fiber preform 9 may be more easily moved.

When the first seal member 111 is formed by stacking a plurality of sheets, it is desirable that the thickness of the first seal member 111 (the total thickness of the plurality of sheets) is greater than or equal to 0.3 mm and less than or equal to 3 mm. When the thickness is set to the minimum value or more, a gap may be more easily prevented from being formed between the outer peripheral surface of the optical fiber preform 9 and the first seal member 111. When the thickness is set to the maximum value or less, the optical fiber preform 9 may be more easily moved.

The second seal member 112 and the third seal member 113 have the same configuration as that of the first seal member 111.

A second pipe 82 is connected to the third compartment 110c corresponding to the lowermost compartment closest to the heating furnace 10 in the sealing device interior 110 so as to introduce a gas thereinto.

Then, the first pipe 81 is connected to the heating furnace interior 100 so as to introduce a gas thereinto. It is desirable that the first pipe 81 is opened to a position close to the opening portion 10a located at the upstream in the heating furnace interior 100.

The first pipe 81 and the second pipe 82 are branched from one end (a first end portion) of one main pipe 80. The other end (a second end portion) of the main pipe 80 is connected to a gas supply source (not shown) which supplies a gas to the main pipe 80. Accordingly, when the flow rate of the gas supplied from the gas supply source to the main pipe 80 is substantially constant, the total sum of the flow rate of the gas supplied from the first pipe 81 to the heating furnace interior 100 and the flow rate of the gas supplied from the second pipe 82 to the third compartment 110c become substantially constant.

It is desirable that the main pipe 80 is provided with a flowmeter, a mass flow controller, a regulator, and the like.

It is desirable that an error of the inner diameter of the first pipe 81 and the second pipe 82 is within 5%, and more desirable that the diameters thereof are substantially equal to each other.

Further, regarding the lengths of the first pipe 81 and the second pipe 82, it is desirable that the ratio between "length of longer pipe"/ "length of shorter pipe" is 10 or less, and more desirable that the ratio is near 1. Alternatively, the ratio may be 1. In the manufacturing apparatus 1 shown in FIG. 1, the length of the first pipe 81 is longer than the length of the second pipe 82.

When a gas flows into the pipe, the stream of the gas may be changed to be easy or difficult in response to the pipe resistance generated in the gas. Then, the pipe resistance is dependent on the inner diameter and the length of the pipe. Therefore, when the inner diameters and the lengths of the first pipe 81 and the second pipe 82 are set as described above, the total sum of the flow rate of the inert gas supplied from the first pipe 81 to the heating furnace interior 100 and the flow rate of the inert gas supplied from the second pipe 82 to the third compartment 110c may be more easily controlled.

Further, here, an example is shown in which the first pipe 81 and the second pipe 82 are branched from one main pipe 80, but the present invention is not limited thereto. For example, the first pipe 81 and the second pipe 82 may be separately provided so as not to be connected to each other, and the total sum of the flow rate of the gas supplied from the first pipe 81 to the heating furnace interior 100 and the flow rate of the gas supplied from the second pipe 82 to the third compartment 110c may be controlled to be substantially constant.

However, the configuration in which the first pipe 81 and the second pipe 82 are branched from one main pipe 80 is desirable in that the total sum of the flow rates of the gases may be easily controlled.

Further, here, an example is shown in which the sealing device interior 110 is divided into three compartments, that is, the first compartment 110a, the second compartment 110b, and the third compartment 110c, but the present invention is not limited thereto. That is, the sealing device interior 110 may be divided into three or more compartments. For example, four seal members such as the first seal member 111 may be provided, and the sealing device interior 110 may be divided into four compartments. However, when the sealing device interior 110 is divided into four or more compartments, the second pipe 82 used to introduce a gas into the sealing device interior 110 needs to be connected to the lowermost compartment closest to the heating furnace 10.

When the sealing device interior 110 is divided into three or more compartments, the distance between the adjacent seal members may all be longer than the length $Y_{9b}$ of the contraction portion 9b. At least the distances ($L_{b1}$ and $L_{c1}$ in the manufacturing apparatus 1) between the seal members forming the lowermost compartment (the third compartment 110c in the manufacturing apparatus 1) closest to the heating furnace 10 and the compartment (the second compartment 110b in the manufacturing apparatus 1) thereabove may all be longer than the length $Y_{9b}$.

Next, an optical fiber manufacturing method when using the manufacturing apparatus 1 will be described by referring to FIGS. 4A to 4D.

First, an inert gas is supplied from the other end (the second end portion) of the main pipe 80 to the heating furnace 10 and the sealing device 11 at the substantially constant flow rate.

Examples of the inert gas to be supplied may include nitrogen, argon, helium, and the like. Among them, helium is more desirable in that the diameter of the fiber may be easily maintained to be small since kinetic viscosity of a gas is small and a Reynolds number is small.

Figure 4A:
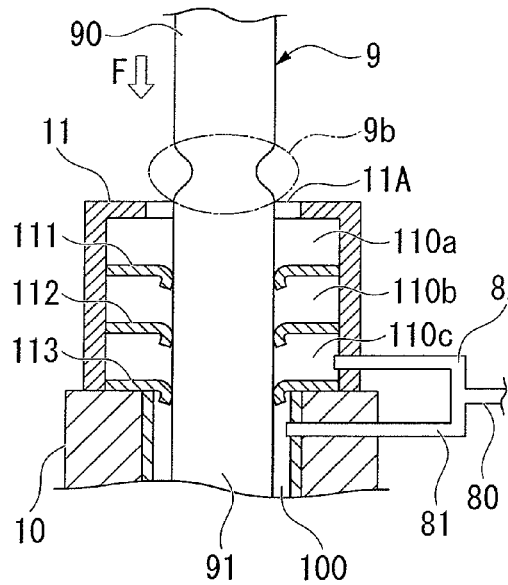
FIG. 4A is a front view illustrating an optical fiber manufacturing method when using the manufacturing apparatus according to the embodiment.

Then, as shown in FIG. 4A, the optical fiber preform 9 is introduced from the upper opening portion 11A into the sealing device interior 110, so that the optical fiber preform 9 is set in the manufacturing apparatus 1. Then, the third compartment 110c is filled with an inert gas, the supplied inert gas flows only to the heating furnace interior 100 instead of the third compartment 110c, and this state is maintained. Here, the timing at which the inert gas flows only to the heating furnace interior 100 instead of the third compartment 110c and the heating furnace interior 100 is dependent on the diameter (for example, the diameter $D_{111}$ of the hole of the first seal member 111) of the hole of the seal member or the outer diameter of the optical fiber preform, and is not unambiguously set.

Subsequently, the optical fiber preform 9 is moved down in the direction depicted by the arrow F along the longitudinal direction to be also introduced into the heating furnace interior 100, and the body portion 91 is melt-drawn by the apparatus that is generally used while the optical fiber preform 9 is inserted through the sealing device 11 and the heating furnace 10. The optical fiber preform 9 is sequentially moved down in the direction denoted by the arrow F in accordance with the melt-drawing operation, so that the contraction portion 9b arrives at an area close to the upper opening portion 11A of the sealing device 11.

Figure 4B:
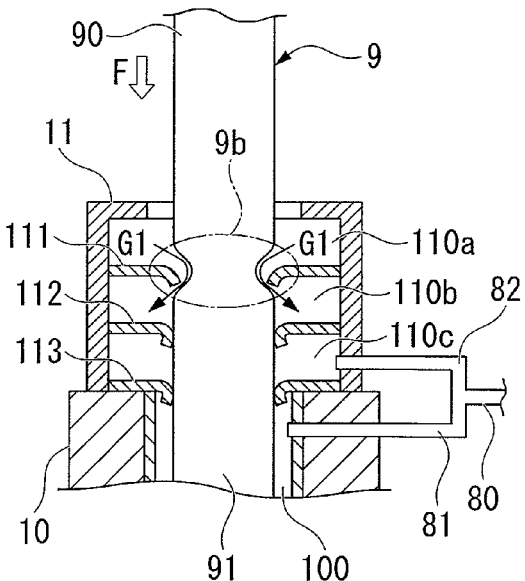
FIG. 4B is a front view illustrating the optical fiber manufacturing method when using the manufacturing apparatus according to the embodiment.

Subsequently, at the time when the contraction portion 9b arrives at a position meeting the first seal member 111 as shown in FIG. 4B, when a gap is formed therebetween, external air intrudes from the first compartment 110a into the second compartment 110b as depicted by the arrow G1. However, since there is no gap therebetween because the optical fiber preform 9 (the body portion 9) and the second seal member 112 come into close contact with each other, the intruded external air is interrupted at the second compartment 110b. Further, the optical fiber preform 9 and the third seal member 113 are maintained to come into close contact with each other during this time.

Here, a case is shown in which the inner peripheral portion of the first seal member 111 contacting the optical fiber preform 9 is bent while not contacting the optical fiber preform 9. This is an example, and since there is a case in which the degree of bending is different in accordance with the time at which the inner peripheral portion is separated from the optical fiber preform 9 or the material of the first seal member 111, the degree of bending may be constant in the contact state or the inner peripheral portion may almost not be bent at all. However, regardless of the degree of bending, the manufacturing apparatus 1 exhibits the effect of the present invention. The same applies to the manufacturing apparatus according to the other embodiments to be described as examples.

Subsequently, when the contraction portion 9b passes through the position of the first seal member 111, the contraction portion 9b arrives at the second compartment 110b. In this state, $L_{b1}$ is longer than $Y_{9b}$, and the first seal member 111, the second seal member 112, and the third seal member 113 all come into close contact with the optical fiber preform 9. Then, since the first seal member 111 comes into close contact with the optical fiber preform 9, external air does not intrude from the first seal member 111.

Figure 4C:
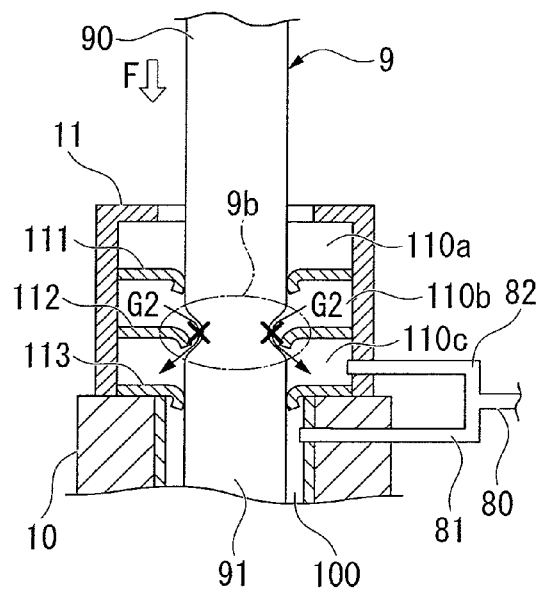
FIG. 4C is a front view illustrating the optical fiber manufacturing method when using the manufacturing apparatus according to the embodiment.

Subsequently, even when the contraction portion 9b arrives at a position passing the second seal member 112 as shown in FIG. 4C, so that a gap is formed therebetween, the pressure between the second compartment 110b and the third compartment 110c becomes equalized if there is a small or no error in the volume of the compartments. For this reason, as depicted by the arrow G2, a gas does not flow from the second compartment 110b to the third compartment 110c. Further, even when there is a large error in the volume of the second compartment 110b and the third compartment 110c, an inert gas is supplied from the second pipe 82 to the third compartment 110c. For this reason, a gas does not flow from the second compartment 110b to the third compartment 110c. Accordingly, external air does not intrude into the third compartment 110c.

Subsequently, when the contraction portion 9b passes through the position of the second seal member 112, the contraction portion 9b arrives at the third compartment 110c. In this state, the first seal member 111, the second seal member 112, and the third seal member 113 all come into close contact with the optical fiber preform 9. Then, external air does not intrude from the front side of the second seal member 112.

Figure 4D:
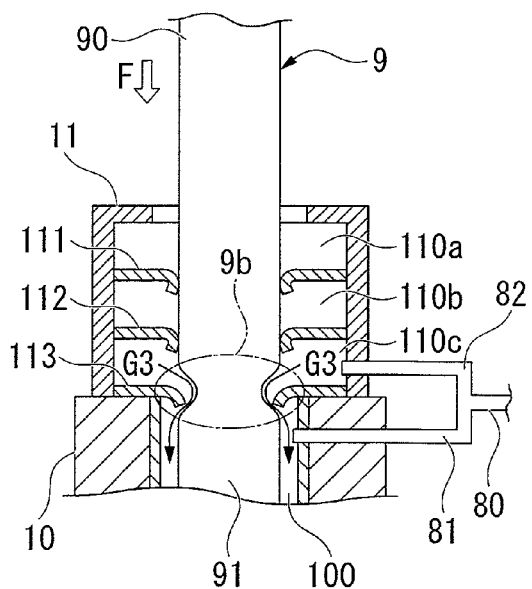
FIG. 4D is a front view illustrating the optical fiber manufacturing method when using the manufacturing apparatus according to the embodiment.

Subsequently, even when the contraction portion 9b arrives at a position passing the third seal member 113 as shown in FIG. 4D, so that a gap is formed therebetween, the inert gas supplied from the main pipe 80 flows from the third compartment 110c to the heating furnace interior 100 as depicted by the arrow G3. At this time, when the inert gas is supplied from the second pipe 82 to the heating furnace interior 100 via the third compartment 110c, the flow rate of the inert gas supplied from the first pipe 81 to the heating furnace interior 100 decreases. Further, the total sum of the flow rate of the inert gas supplied from the first pipe 81 to the heating furnace interior 100 and the flow rate of the inert gas supplied from the second pipe 82 to the third compartment 110c is substantially constant. For this reason, the total flow rate of the gas flowing into the heating furnace interior 100 is substantially constant. Accordingly, the stream of the gas in the heating furnace interior 100 does not locally change greatly.

Subsequently, when the contraction portion 9b passes through the position of the third seal member 113, the contraction portion 9b arrives at the heating furnace interior 100. In this state, the first seal member 111, the second seal member 112, and the third seal member 113 all come into close contact with the optical fiber preform 9. Accordingly, external air does not intrude into the heating furnace interior 100.

After the contraction portion 9b arrives at the heating furnace interior 100, the optical fiber preform 9 may be continuously moved down if necessary so that the melt-drawing operation is performed in accordance with the known method.

When the manufacturing apparatus 1 is not provided with the main pipe 80, and the first pipe 81 and the second pipe 82 are separately provided without being connected to each other, the total sum of the flow rate of the inert gas supplied from the first pipe 81 to the heating furnace interior 100 and the flow rate of the inert gas supplied from the second pipe 82 to the third compartment 110c may be controlled to be substantially constant. For realizing this, for example, the supply ends of the inert gas in the first pipe 81 and the second pipe 82 may be connected to the gas supply source, and the amount of the gas supplied from the gas supply source may be controlled by a computer or the like so that the total sum of the flow rates of the gases is substantially constant.

When the manufacturing apparatus 1 is used, the contraction portion 9b does not simultaneously meet all compartments from the first compartment 110a to the third compartment 110c in the sealing device 11 during the melt-drawing operation as described above. Further, the inert gas is made to flow into a space (a closed space) that is not opened to the outside of the sealing device 11. In such a condition, the optical fiber preform 9 is moved, so that the external air is prevented from intruding into the heating furnace interior 100, and the stream of the gas does not locally change greatly in the heating furnace interior 100. When the inert gas flows into a space (an opened space) that is opened to the outside of the sealing device 11, the flow rate of the inert gas into the heating furnace interior 100 greatly decreases, so that the stream of the gas locally changes greatly in the heating furnace interior 100.

In the existing manufacturing apparatus, it was difficult to maintain the air-tightness between the seal member and the optical fiber preform, and to prevent the external air from intruding into the heating furnace interior while preventing a large variation in the local stream of the gas. For example, when the contraction portion is irregularly or locally present in the circumferential direction of the optical fiber preform, the problem is particularly conspicuous. However, since the manufacturing apparatus 1 of the embodiment has three stages of seal members, such a problem of the existing manufacturing apparatus may be solved. Since the manufacturing apparatus according to the other embodiments of the present invention to be described later has multiple stages of seal members, such a problem of the existing manufacturing apparatus may be solved.

When a sealing device having the sealing device interior 110 divided into four or more compartments is used as the sealing device 11, the optical fiber preform 9 may be moved so that the contraction portion 9b does not simultaneously meet all compartments from the uppermost compartment farthest from the heating furnace 10 to the lowermost compartment closest to the heating furnace 10. Then, the inert gas may be supplied to the heating furnace interior 100 and the lowermost compartment while controlling the total sum of the flow rates of the inert gases to be substantially constant.

(Second Embodiment)

Figure 5:
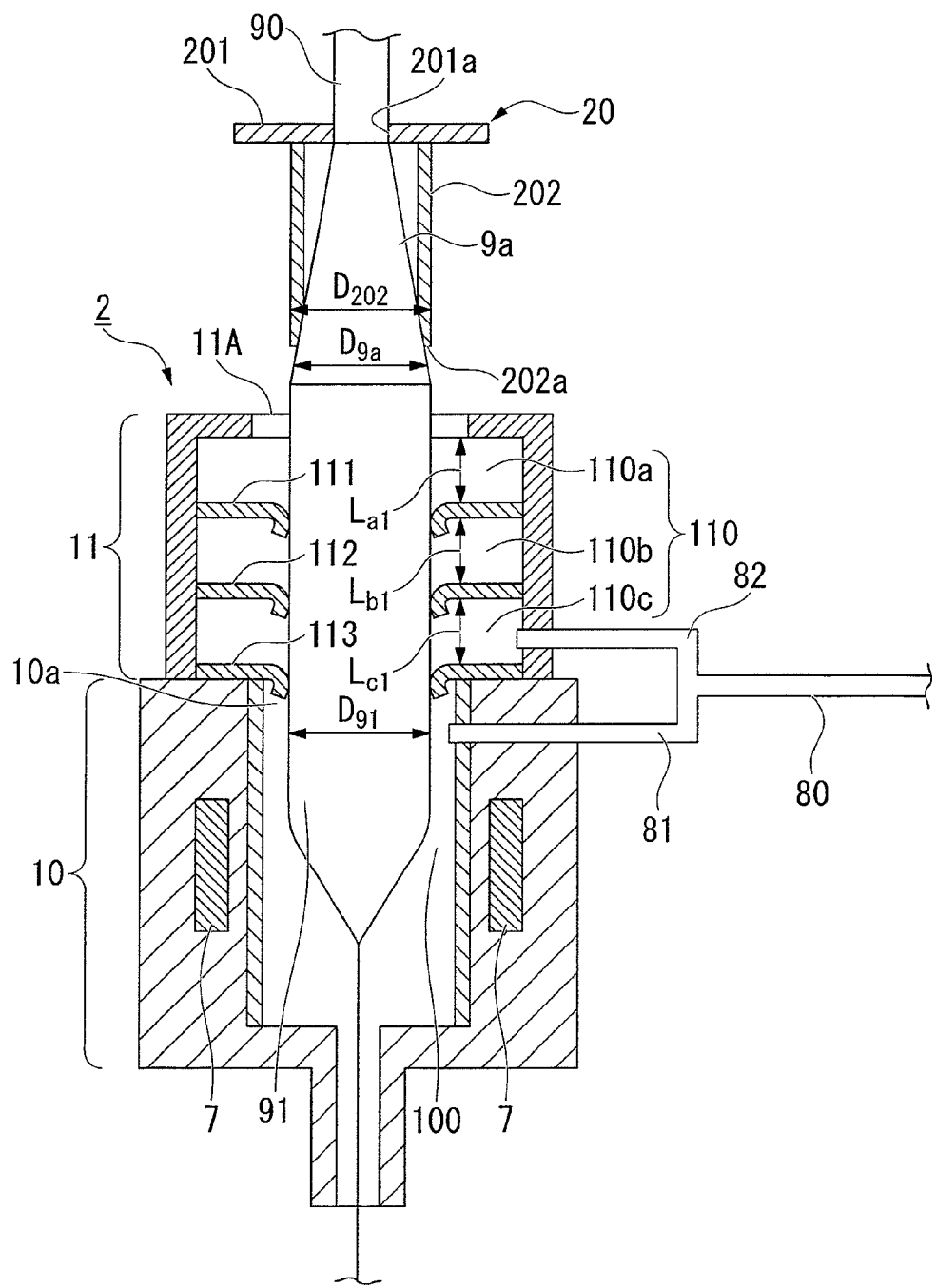
FIG. 5 is a front view illustrating a main part of a manufacturing apparatus according to a second embodiment of the present invention.

FIG. 5 is a front view illustrating a main part of a manufacturing apparatus according to a second embodiment of the present invention.

Further, the same reference numerals will be given to the same components of FIG. 5 as those of FIG. 1, and the detailed description of the same components as those of FIG. 1 will be omitted. The same applies to the other embodiments to be described as examples.

The manufacturing apparatus 2 shown in FIG. 5 further includes an adapter 20 which is attached to the optical fiber preform 9 in addition to the manufacturing apparatus 1. In FIG. 5, the cross-section of the adapter 20 is shown.

The manufacturing apparatus 2 is particularly appropriate for a case where an optical fiber preform having a large reduction width in the outer diameter $D_{9a}$ of the boundary portion 9a of the dummy portion 90 is used as the optical fiber preform 9.

In the optical fiber preform 9, the outer diameter $D_{9a}$ of the boundary area 9a decreases toward the end portion opposite to the boundary area 9a of the dummy portion 90. Then, the contraction portion is provided throughout the substantially entire area of the boundary area 9a.

The adapter 20 is attached to cover the boundary area 9a, has a substantially cylindrical shape, and includes a flange portion 201 and an attachment portion 202. The flange portion 201 is provided with an opening portion (an opening portion located at the upstream) 201a.

In the adapter 20, the inner diameter of the opening portion 201a is substantially equal to the substantially constant outer diameter of the dummy portion 90. Accordingly, the opening portion 201a comes into close contact with the outer peripheral surface of the dummy portion 90 while the optical fiber preform 9 is inserted through the adapter 20. Further, in order to improve the adhesion between the outer peripheral surface of the dummy portion 90 and the opening portion 201a, the opening portion 201a may be further provided with a sealing member (not shown) such as a heat-resistant packing.

The inner diameter of attachment portion 202 and the outer diameter thereof are substantially constant along the longitudinal direction of the attachment portion. Then, the outer diameter $D_{202}$ of the attachment portion 202 is substantially equal to the outer diameter $D_{91}$ of the body portion 91 of the optical fiber preform 9. For example, when the outer diameter $D_{91}$ is greater than or equal to about 100 and less than or equal to about 200 mm, it is desirable that a difference between the outer diameter $D_{202}$ and the outer diameter $D_{91}$ is greater than or equal to −5 mm and less than or equal to +5 mm.

The length of the attachment portion 202 in the longitudinal direction is longer than the sum of the distance $L_{a1}$ from the upper opening portion 11A of the sealing device 11 to the first seal member, the distance $L_{b1}$ between the first seal member 111 and the second seal member 112, and the thickness of the first seal member. Further, as described below, an opening end 202a of the attachment portion 202 may be further provided with a sealing member (not shown) such as a heat-resistant packing in order to improve the adhesion between the outer peripheral surface of the boundary area 9a in the optical fiber preform 9 and the opening end 202a.

The flange portion 201 has a size capable of covering the upper opening portion 11A of the sealing device 11 while the optical fiber preform 9 is inserted through the flange portion 201.

The optical fiber preform 9 is inserted from the opening end 202a (the opening portion located at the downstream) of the attachment portion 202 to the attachment portion 202 toward the opening portion 201a of the flange portion 201, the dummy portion 90 is protruded from the opening portion 201a, and the opening end 202a is brought into contact with the outer peripheral surface of the boundary area 9a, whereby the adapter 20 is attached to the optical fiber preform 9.

In such an attachment state of the adapter 20, the opening portion 201a comes into close contact with the outer peripheral surface of the dummy portion 90, and the opening end 202a comes into close contact with the boundary area 9a. That is, in the boundary area 9a, the attachment portion of the adapter 20 is sealed from the external air. On the other hand, in the boundary area 9a, the non-attachment portion of the adapter 20 located at the side of the body portion 91 is in an exposed state. Accordingly, in the boundary area 9a, the attachment portion of the adapter 20 has an outer diameter that is substantially equal to that of the body portion 91 of the optical fiber preform 9. The non-attachment portion of the adapter 20 is the contraction portion that has an outer diameter smaller than the outer diameter of the body portion 91. The optical fiber preform 9 having the adapter 20 attached thereto may be handled in the same manner as, for example, the optical fiber preform shown in FIG. 2. In this case, the non-attachment portion of the adapter 20 corresponds to the contraction portion 9b.

The material of the adapter 20 may be the same as that of the sealing device 11, or may be formed of silica glass or the like.

The manufacturing apparatus 2 is the same as the manufacturing apparatus 1 according to the first embodiment except that the adapter 20 is further provided.

Next, an optical fiber manufacturing method when using the manufacturing apparatus 2 will be described by referring to FIGS. 6A to 6C.

First, as in the manufacturing apparatus 1, the inert gas is supplied from the other end (the second end portion) of the main pipe 80 to the heating furnace 10 and the sealing device 11 at the substantially constant flow rate. Then, the optical fiber preform 9 having the adapter 20 attached thereto is set in the manufacturing apparatus 2. Then, the third compartment 110c is filled with the inert gas. Subsequently, the supplied inert gas is maintained to flow only to the heating furnace interior 100 instead of the third compartment 110c and the heating furnace interior 100.

Figure 6A:
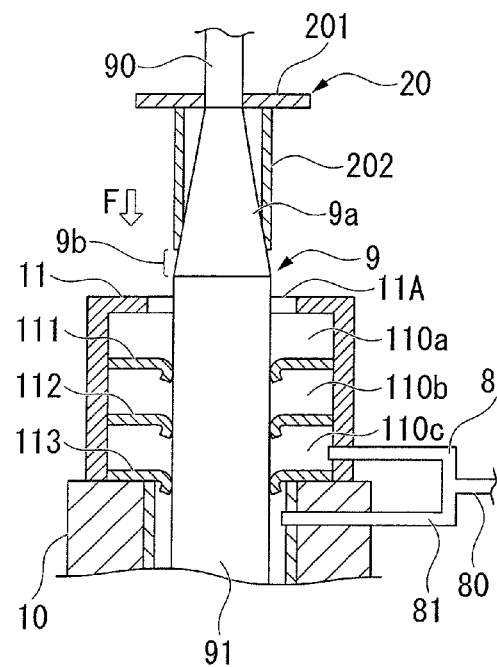
FIG. 6A is a front view illustrating an optical fiber manufacturing method when using the manufacturing apparatus according to the embodiment.

Subsequently, as shown in FIG. 6A, the optical fiber preform 9 having the adapter 20 attached thereto is moved down in the direction depicted by the arrow F along the longitudinal direction thereof, so that the optical fiber preform 9 is inserted through the sealing device 11 and the heating furnace 10. In this state, the body portion 91 is melt-drawn by the existing method. The optical fiber preform 9 is sequentially moved down in the direction depicted by the arrow F in accordance with the melt-drawing operation, so that the contraction portion 9b arrives at a position close to the upper opening portion 11A of the sealing device 11.

Subsequently, as in the case of using the manufacturing apparatus 1, even when the contraction portion 9b arrives at a position passing the first seal member 111, so that a gap is formed therebetween, the intruded external air is blocked by the second compartment 110b. Then, when the contraction portion 9b arrives at the second compartment 110b, the external air does not intrude from the front side of the first seal member 111.

Further, even when the contraction portion 9b arrives at a position passing the second seal member 112, so that a gap is formed therebetween, the external air does not intrude into the third compartment 110c.

Figure 6B:
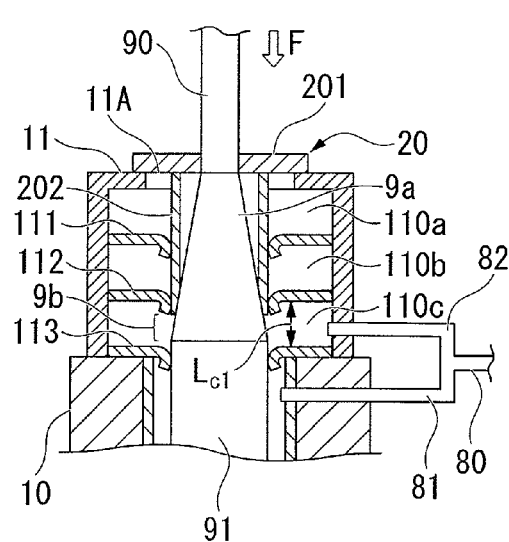
FIG. 6B is a front view illustrating the optical fiber manufacturing method when using the manufacturing apparatus according to the embodiment.

Subsequently, as shown in FIG. 6B, when the contraction portion 9b passes through the position of the second seal member 112, the contraction portion 9b arrives at the third compartment 110c. In this stage, the flange portion 201 of the adapter 20 comes into close contact with the upper opening 11A of the sealing device 11, so that it blocks the opening portion 11A and the downward movement of the adapter 20 is stopped. In this state, $L_{c1}$ is longer than $Y_9b$. The first seal member 111 and the second seal member 112 both come into close contact with the attachment portion 202 of the adapter 20. The third seal member 113 comes into close contact with the body portion 91 of the optical fiber preform 9. That is, the contraction portion 9b does not simultaneously meet the third compartment 110c as the lowermost compartment and the second compartment 110b thereabove. Then, the external air does not intrude into the third compartment 110c. Further, since the dummy portion 90 of the optical fiber preform 9 comes into close contact with the flange portion 201 of the adapter 20, the external air does not intrude into the sealing device interior 110 anymore.

Subsequently, when only the optical fiber preform 9 is moved down in the direction depicted by the arrow F, the contraction portion 9b is enlarged in accordance with the downward movement distance, and $Y_{9b}$ increases.

Figure 6C:
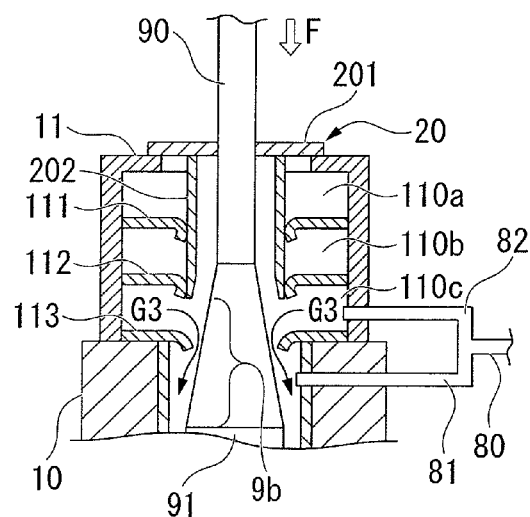
FIG. 6C is a front view illustrating the optical fiber manufacturing method when using the manufacturing apparatus according to the embodiment.

Then, as shown in FIG. 6C, even when the contraction portion 9b arrives at a position passing the third seal member 113, so that a gap is formed therebetween, the external air does not intrude into the third compartment 110c. For this reason, the external air does not intrude into the heating furnace interior 100. Further, as depicted by the arrow G3, the inert gas supplied from the main pipe 80 flows from the third compartment 110c to the heating furnace interior 100. At this time, even when the inert gas is supplied from the second pipe 82 to the heating furnace interior 100 through the third compartment 110c, the flow rate of the inert gas supplied from the first pipe 81 to the heating furnace interior 100 decreases. Further, the total sum of the flow rate of the inert gas supplied from the first pipe 81 to the heating furnace interior 100 and the flow rate of the inert gas supplied from the second pipe 82 to the third compartment 110c is substantially constant. For this reason, the total sum of the flow rates of the gases flowing to the heating furnace interior 100 is substantially constant. Accordingly, the stream of the gas does not locally change greatly in the heating furnace interior 100.

Then, after this stage, the third compartment 110c and the interior of the attachment portion 202 of the adapter 20 are opened to the heating furnace interior 100. However, as described above, since the external air does not intrude into the sealing device interior 110, the external air also does not intrude into the heating furnace interior 100.

After the contraction portion 9b arrives at the heating furnace interior 100, the optical fiber preform 9 may be continuously moved down if necessary so that the melt-drawing operation is performed in accordance with the known method.

When the manufacturing apparatus 2 is used, the contraction portion 9b does not simultaneously meet all compartments from the first compartment 110a to the third compartment 110c in the sealing device 11 during the melt-drawing operation as described above. Further, when the upper opening portion 11A of the sealing device 11 is blocked by the flange portion 201 of the adapter 20, the contraction portion 9b does not simultaneously meet the position from the third compartment 110c to the second compartment 110b. Further, the inert gas is made to flow into a space (closed space) that is not opened to the outside of the sealing device 11. With such a configuration, the external air is prevented from intruding into the heating furnace interior 100, and the stream of the gas does not locally change greatly in the heating furnace interior 100.

(Third Embodiment)

Figure 7:
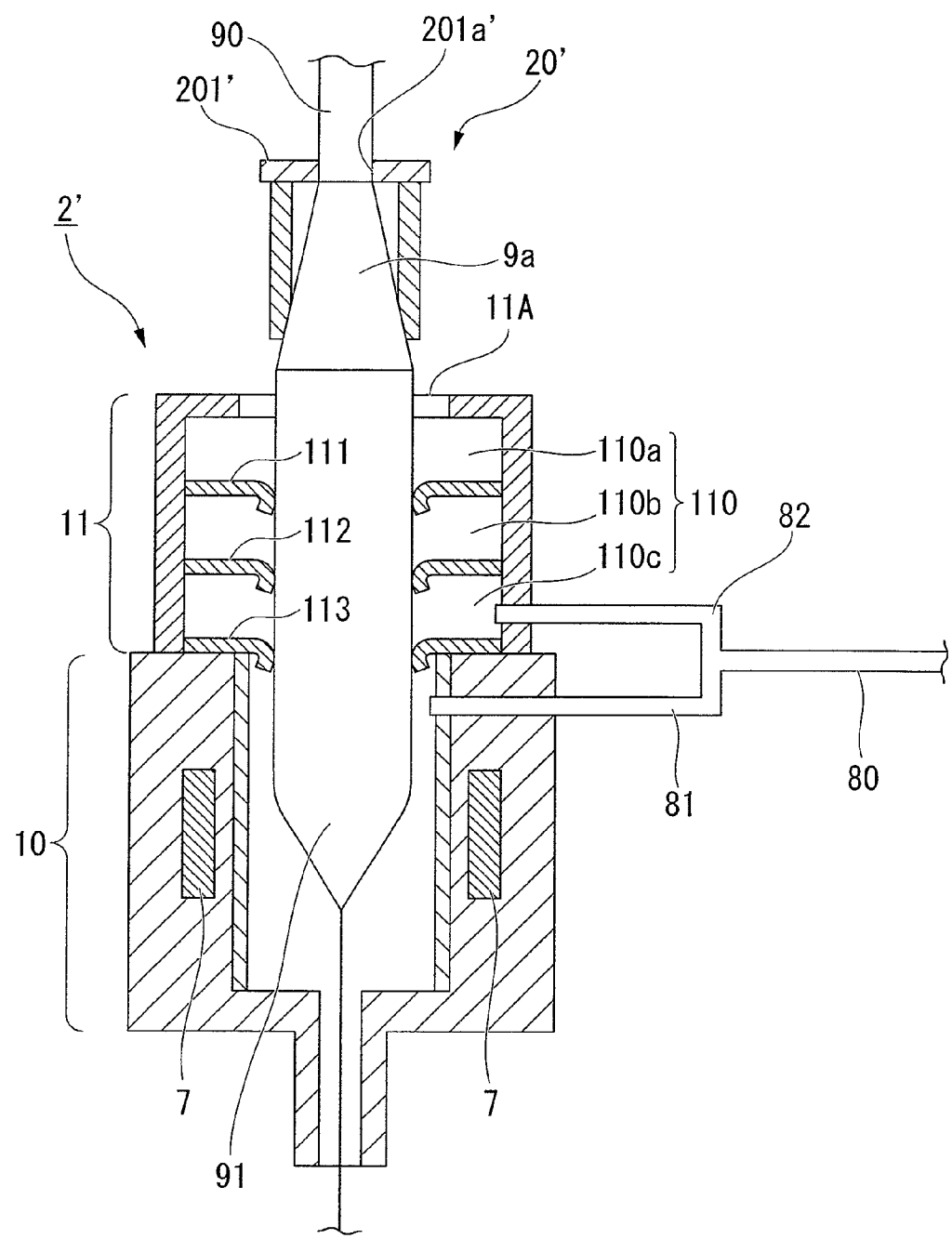
FIG. 7 is a front view illustrating a main part of a manufacturing apparatus according to a third embodiment of the present invention.

FIG. 7 is a front view illustrating a main part of a manufacturing apparatus according to a third embodiment of the present invention.

A manufacturing apparatus 2' is an apparatus in which the flange portion 201 of the adapter 20 of the manufacturing apparatus 2 shown in FIG. 5 is formed in a size incapable of covering the upper opening 11A of the sealing device 11 while the optical fiber preform 9 is inserted therethrough. That is, in an adapter 20' of the manufacturing apparatus 2', an opening portion 201a' comes into close contact with the outer peripheral surface of the dummy portion 90. However, since the outer diameter of the flange portion 201' is smaller than the inner diameter of the upper opening portion 11A of the sealing device 11, the flange portion 201' comes into close contact with the upper opening portion 11A of the sealing device 11, whereby the flange portion may not block the upper opening portion 11A. Then, the adapter 20' is formed of a material such as silica glass. The other configurations of the manufacturing apparatus 2' are the same as those of the manufacturing apparatus 2 shown in FIG. 5.

Further, here, a case is exemplified in which the adapter 20' includes the flange portion 201', but an adapter may be used which does not include the flange portion and the protrusion portion in the direction perpendicular to the longitudinal direction (the axial direction) of the attachment portion.

The optical fiber preform 9 having the adapter 20' attached thereto may be handled exactly in the same manner as, for example, the optical fiber preform having the boundary area shown in FIG. 2. Accordingly, when the manufacturing apparatus 2' is used, the optical fiber may be manufactured in the same manner as the manufacturing apparatus 1.

(Fourth Embodiment)

Figure 8:
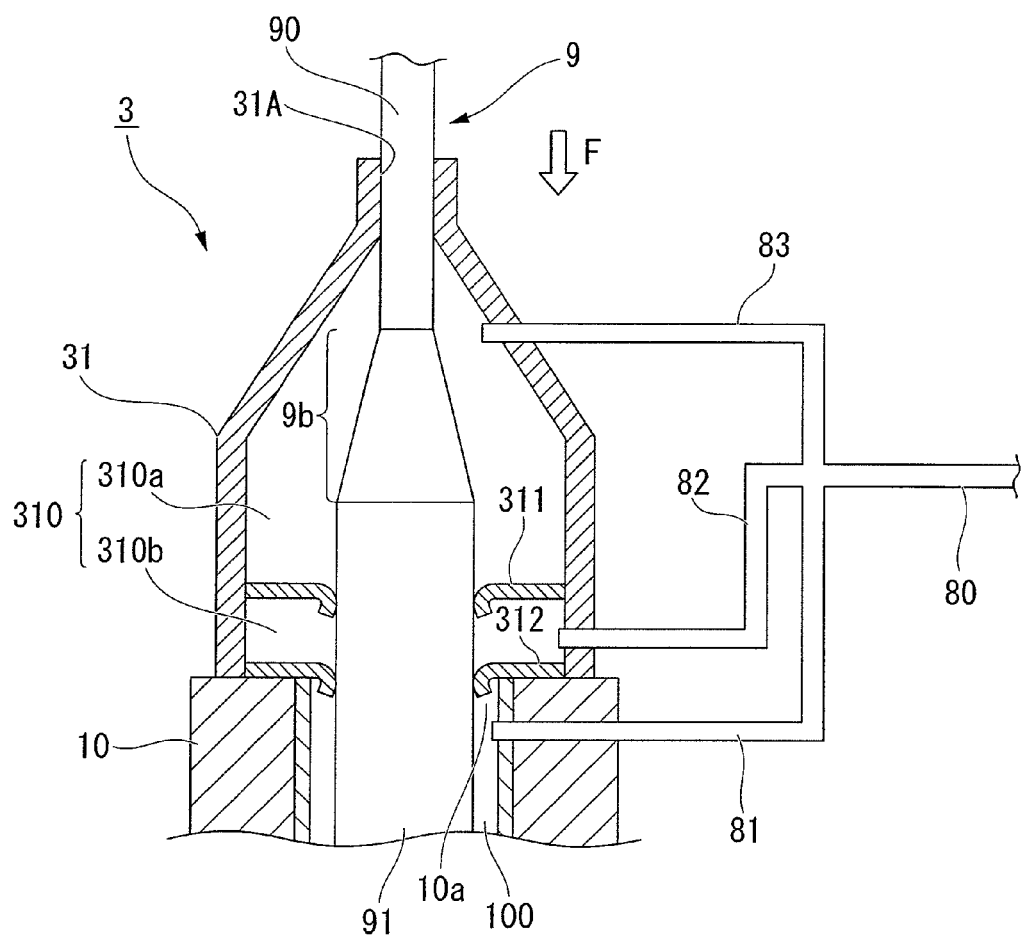
FIG. 8 is a front view illustrating a main part of a manufacturing apparatus according to a fourth embodiment of the present invention.

FIG. 8 is a front view illustrating a main part of a manufacturing apparatus according to a fourth embodiment of the present invention.

A manufacturing apparatus 3 shown in this drawing includes the heating furnace 10 and a sealing device 31 provided on the opening portion 10a located at the upstream of the heating furnace 10.

The sealing device 31 has a function of preventing the external air from intruding into the heating furnace interior 100 while the optical fiber preform 9 is inserted through an internal space 310 (hereinafter, simply referred to as a sealing device interior 310) of the sealing device 31 and the heating furnace interior 100.

The sealing device 31 has a substantially cylindrical shape. The inner surface of the sealing device 31 is provided with a first seal member 311 and a second seal member 312 provided thereon in a protruding manner. Then, the sealing device interior 310 is divided into two compartments, that is, a first compartment 310a and a second compartment 310b along the longitudinal direction (the axial direction) of the optical fiber preform 9 by the two seal members contacting the outer peripheral surface of the body portion 91 while the optical fiber preform 9 is inserted through the sealing device interior 310.

In the opening portion (the opening portion of the first compartment 310a) 31A located at the upstream of the sealing device 31, the inner diameter thereof is substantially equal to the substantially constant outer diameter of the dummy portion 90 of the optical fiber preform 9. Accordingly, the opening portion 31A comes into close contact with the outer peripheral surface of the dummy portion 90 while the optical fiber preform 9 is inserted through the opening portion 31A. Further, as in the case of the adapter 20 shown in FIG. 5, a sealing member (not shown) such as a heat-resistant packing may be further provided in the opening portion 31A in order to improve the adhesion with respect to the outer peripheral surface of the dummy portion 90.

Likewise, the first compartment 310a seals the contraction portion 9b of the optical fiber preform 9 when the optical fiber preform is inserted therethrough. Further, here, an example is shown in which the optical fiber preform is the same as the optical fiber preform shown in FIG. 5.

The material of the sealing device 31 is the same as that of the sealing device 11 shown in FIG. 1. The materials of the first seal member 311 and the second seal member 312 are the same as that of the sealing device 11 shown in FIG. 1.

The volume of the second compartment 310b may be larger or smaller than that of the first compartment 310a. From the view point of a decrease in size of the sealing device 31, it is desirable that the volume of the second compartment 310b is smaller than that of the first compartment 310a.

In the sealing device interior 310, the second compartment 310b as the lowermost compartment closest to the heating furnace 10 is connected to the second pipe 82 so as to introduce a gas thereinto. Further, the first compartment 310a as the uppermost compartment farthest from the heating furnace 10 is connected to the third pipe 83 so as to introduce a gas thereinto.

Then, the heating furnace interior 100 is connected to the first pipe 81 so as to introduce a gas thereinto. It is desirable that the first pipe 81 is opened to a position close to the opening portion 10a located at the upstream in the heating furnace interior 100.

The first pipe 81, the second pipe 82, and the third pipe 83 are branched from one end (the first end portion) of one main pipe 80, and the other end (the second end portion) of the main pipe 80 is connected to a gas supply source (not shown) that supplies a gas to the main pipe 80. Accordingly, when the flow rate of the inert gas supplied from the gas supply source to the main pipe 80 is substantially constant, the total sum of the flow rate of the inert gas supplied from the first pipe 81 to the heating furnace interior 100, the flow rate of the inert gas supplied from the second pipe 82 to the second compartment 310b, and the flow rate of the inert gas supplied from the third pipe 83 to the first compartment 310a becomes substantially constant.

It is desirable that an error in the inner diameters of the first pipe 81, the second pipe 82, and the third pipe 83 is within 5%, and more desirable that the inner diameters are substantially equal to each other.

Further, regarding the lengths of the first pipe 81, the second pipe 82, and the third pipe 83, it is desirable that the ratio between "length of longest pipe"/"length of shortest pipe" is 10 or less, and more desirable that the ratio is near 1. Alternatively, the ratio may be 1. In the manufacturing apparatus 3 shown in FIG. 8, the length of the first pipe 81 is the longest, and the length of the third pipe 83 is the shortest.

When the inner diameters and the lengths of the first to third pipes 81 to 83 are set as described above, the total sum of the flow rate of the inert gas supplied from the first pipe 81 to the heating furnace interior 100, the flow rate of the inert gas supplied from the second pipe 82 to the second compartment 310b, and the flow rate of the inert gas supplied from the third pipe 83 to the first compartment 310a may be more easily controlled.

Further, here, an example is shown in which the first to third pipes 81 to 83 are branched from one main pipe 80, but the present invention is not limited thereto. That is, the total sum of the flow rates of the inert gases may be controlled to be substantially constant. For example, as in the manufacturing apparatus 1 shown in FIG. 1, one or all of the first to third pipes 81 to 83 may be separately provided without being connected to the other pipe. However, the configuration in which the first to third pipes 81 to 83 are branched from one main pipe 80 is desirable in that the total sum of the flow rates of the gases may be easily controlled.

Further, here, an example is shown in which the sealing device interior 310 is divided into two compartments, but the present invention is not limited thereto. That is, the sealing device interior 310 may be divided into two or more compartments. For example, three seal members may be provided to have the same configuration as that of the first seal member 311, and the sealing device interior 310 may be divided into three compartments. Then, when the sealing device interior 310 is divided into three or more compartments, the second pipe 82 introducing a gas into the sealing device 31 needs to be connected to the lowermost compartment closest to the heating furnace 10, and the third pipe 83 needs to be connected to the uppermost compartment farthest from the heating furnace 10. However, from the viewpoint that a sufficient effect may be obtained by a sealing device having a simple configuration, it is desirable that the sealing device interior 310 is divided into two or three compartments.

Further, here, an example is described in which the optical fiber preform used herein is the same as the optical fiber preform shown in FIG. 5, but the manufacturing apparatus 3 may be appropriately used to manufacture, for example, the optical fiber preform shown in FIG. 1 or any optical fiber preform.

Next, an optical fiber manufacturing method when using the manufacturing apparatus 3 will be described by referring to FIG. 9.

First, as in the manufacturing apparatus 1, the inert gas is supplied from the other end (the second end portion) of the main pipe 80 to the heating furnace 10 and the sealing device 31 at the substantially constant flow rate. Then, as shown in FIG. 8, the opening portion 31A of the sealing device 31 is made to come into close contact with the outer peripheral surface of the dummy portion 90, so that the optical fiber preform 9 is inserted through the sealing device 31 and the heating furnace 10 to be set in the manufacturing apparatus 3. Then, the first compartment 310a and the second compartment 310b are filled with the inert gas. Subsequently, the supplied inert gas is maintained to flow only to the heating furnace interior 100 instead of the compartments.

Subsequently, the body portion 91 is melt-drawn by a device that is generally used for this process. The optical fiber preform 9 is sequentially moved down in the direction depicted by the arrow F in accordance with the melt-drawing operation, so that the contraction portion 9*b* arrives at a position close to the first seal member 311.

Figure 9:
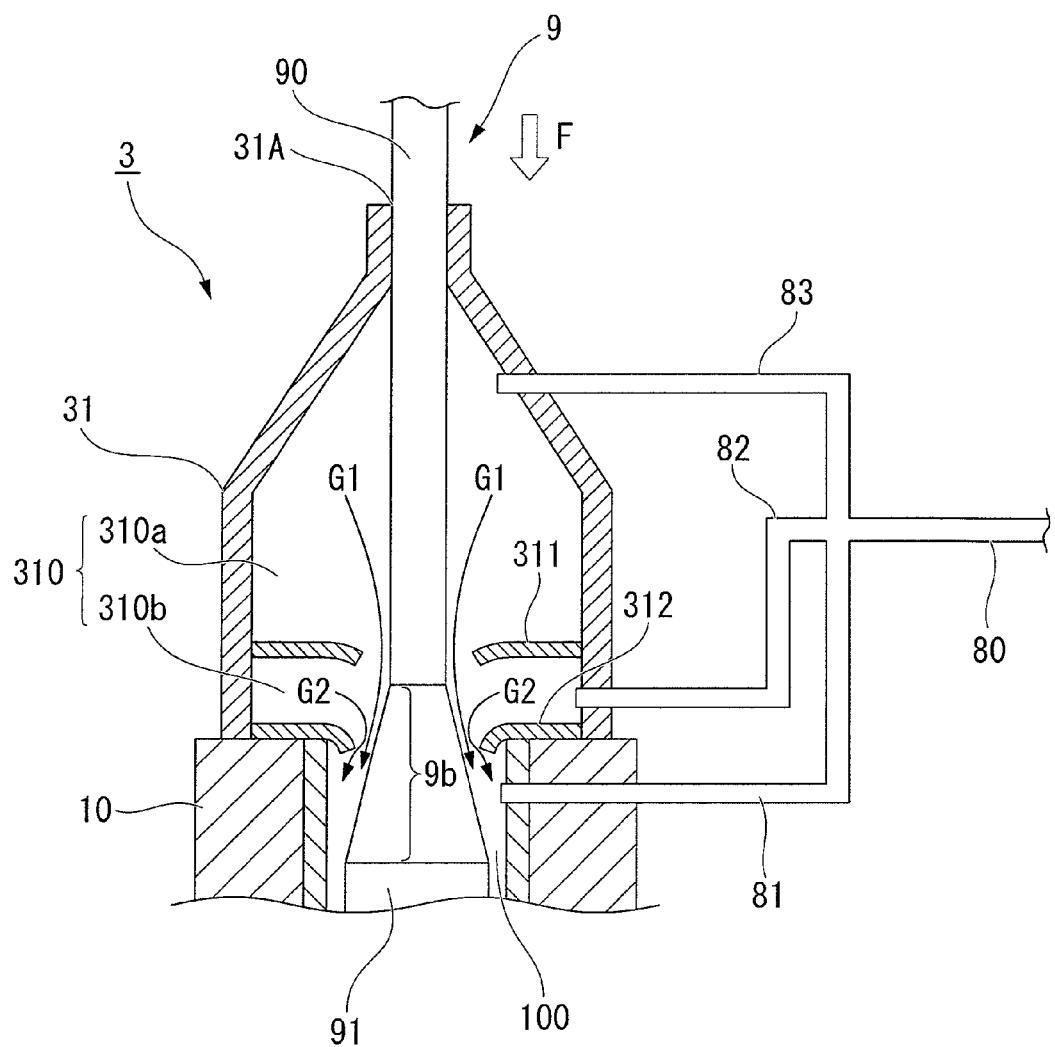
FIG. 9 is a front view illustrating an optical fiber manufacturing method when using the manufacturing apparatus according to the embodiment.

Subsequently, as shown in FIG. 9, even when the contraction portion 9*b* arrives at a position passing the second seal member 312, so that a gap is formed therebetween, the inert gas supplied from the main pipe 80 flows from the first compartment 310*a* and the second compartment 310*b* to the heating furnace interior 100 as depicted by the arrows G1 and G2. At this time, even when the inert gas is supplied to the heating furnace interior 100 through the first compartment 310*a* and the second compartment 310*b*, the flow rate of the inert gas supplied from the first pipe 81 to the heating furnace interior 100 decreases. Further, since the total sum of the flow rate of the inert gas supplied from the first pipe 81 to the heating furnace interior 100, the flow rate of the inert gas supplied from the second pipe 82 to the second compartment 310*b*, and the flow rate of the inert gas supplied from the third pipe 83 to the first compartment 310*a* is substantially constant, the total sum of the flow rates of the gases flowing into the heating furnace interior 100 is substantially constant. Accordingly, the stream of the gas does not locally change greatly in the heating furnace interior 100.

Subsequently, when the contraction portion 9*b* passes through a position of the second seal member 312, the entire contraction portion 9*b* arrives at the heating furnace interior 100. In this state, the opening portion 31A of the sealing device 31 comes into close contact with the outer peripheral surface of the dummy portion 90 of the optical fiber preform 9. Accordingly, the external air does not intrude into the heating furnace interior 100.

After the entire contraction portion 9*b* arrives at the heating furnace interior 100, the melt-drawing operation may be performed in accordance with the existing method while the optical fiber preform 9 is continuously moved down if necessary.

In the manufacturing apparatus 3, one or all of the first to third pipes 81 to 83 may be separately provided without being connected to the other pipe. In this case, in order to obtain the substantially constant total sum of the flow rate of the inert gas supplied to the heating furnace interior 100, the flow rate of the inert gas supplied to the second compartment 310*b*, and the flow rate of the inert gas supplied to the first compartment 310*a*, for example, the inert gas supply ends of the first to third pipes 81 to 83 are connected the gas supply source, and the amount of the inert gas supplied from the gas supply source may be controlled by a computer or the like so that the total sum of the flow rates of the gases is substantially constant.

When the manufacturing apparatus 3 is used, in the sealing device 31, as described above, the inert gas is made to flow into a space (a closed space) that is not opened to the outside of the sealing device 31, and the optical fiber preform is moved during the melt-drawing operation. Accordingly, the external air is prevented from intruding into the heating furnace interior 100, and the stream of the gas does not locally change greatly in the heating furnace interior 100.

(Fifth Embodiment)

Figure 10:
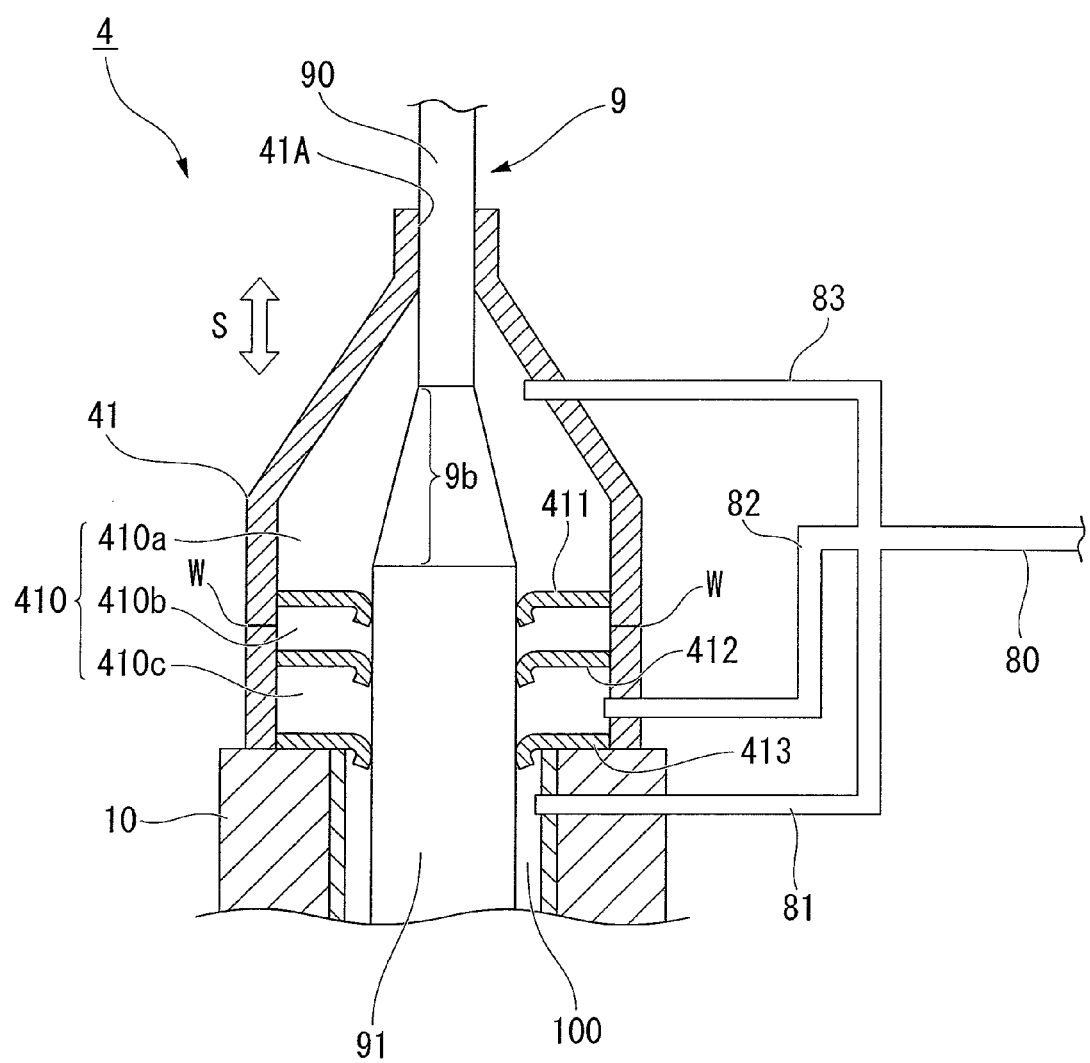
FIG. 10 is a front view illustrating a main part of a manufacturing apparatus according to a fifth embodiment of the present invention.

FIG. 10 is a front view illustrating a main part of a manufacturing apparatus according to a fifth embodiment of the present invention.

A manufacturing apparatus 4 shown in this drawing has a configuration in which the sealing device interior of the manufacturing apparatus 3 shown in FIG. 8 is divided into three compartments, and the uppermost compartment among them is attachable to or detachable from the other portion of the sealing device. The specific configuration is as follows.

The inner surface of the sealing device 41 of the manufacturing apparatus 4 is provided with a first seal member 411, a second seal member 412, and a third seal member 413 provided thereon in a protruding manner. Then, a sealing device interior 410 is divided into three compartments, that is, a first compartment 410*a*, a second compartment 410*b*, and a third compartment 410*c* along the longitudinal direction (the axial direction) of the optical fiber preform 9 by the three seal members contacting the outer peripheral surface of the body portion 91 while the optical fiber preform 9 is inserted through an internal space 410 (hereinafter, simply referred to as the sealing device interior 410) in the sealing device 41.

The first to third seal members 411 to 413 have the same configurations as those of the first seal member 311 and the second seal member 312 of the manufacturing apparatus 3.

The first compartment 410*a* as the uppermost compartment is independently attachable to or detachable from the other portion of the sealing device 41.

Then, the first compartment 410*a* is movable in the direction depicted by the arrow S in the drawing along the longitudinal direction of the optical fiber preform by an existing driving device.

Here, an example is shown in which the division position W between the first compartment 410*a* and the other portion is present at a portion corresponding to the second compartment 410*b*. That is, when the sealing device 41 is formed by fixing the first compartment 410*a*, the second compartment 410*b* is formed for the first time. Accordingly, at the division position W, it is desirable to maintain the air-tightness when fixing the first compartment 410*a*. For this configuration, for example, the fixation operation may be performed by using a heat-resistant packing or the like, or the first compartment 410*a* and the other portion may be fitted and fixed to each other.

In the sealing device 41, the second pipe 82 is connected to the third compartment 410*c* which is the lowermost compartment closest to the heating furnace 10. The other pipe has the same configuration as that of the manufacturing apparatus 3.

Next, an optical fiber manufacturing method when using the manufacturing apparatus 4 will be described by referring to FIG. 11.

First, as in the case of using the manufacturing apparatus 3, the inert gas is supplied from the other end (the second pipe) of the main pipe 80 to the heating furnace 10 and the sealing device 31 at the substantially constant flow rate.

Figure 11:
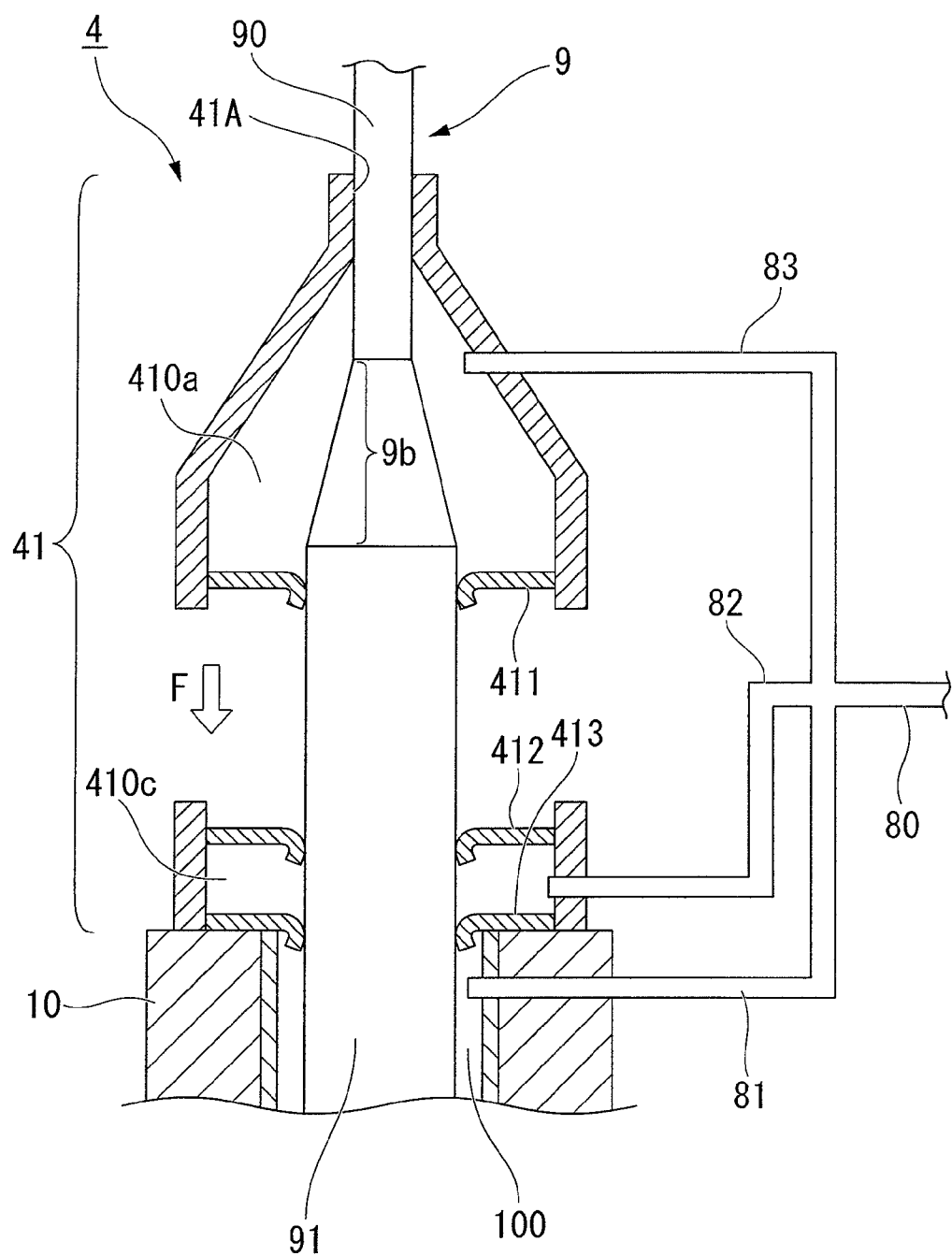
FIG. 11 is a front view illustrating an optical fiber manufacturing method when using the manufacturing apparatus according to the embodiment.

Subsequently, as shown in FIG. 11, the first compartment 410*a* as the uppermost compartment farthest from the heating furnace 10 is separated from the other portion of the sealing device 41. In this state, the opening portion 41A located at the upstream of the first compartment 410*a* comes into close contact with the outer peripheral surface of the dummy portion 90 of the optical fiber preform 9. Further, the first seal member 411 comes into close contact with the body portion 91 of the optical fiber preform 9. In this manner, the sealing operation is performed by disposing the contraction portion 9*b* at the first compartment 410*a*. Then, the exposed portion of the body portion 91 of the optical fiber preform 9 is inserted through the internal space of the sealing device 41 where the first compartment 410*a* is separated and the heating furnace interior 100, so that the optical fiber preform 9 is set in the manufacturing apparatus 4. Then, the first compartment 410*a* and the third compartment 410*c* are filled with the inert gas.

Subsequently, the supplied inert gas is maintained to flow only to flow the heating furnace interior 100 instead of the compartments.

Subsequently, the body portion 91 is melt-drawn by an existing unit while the first compartment 410a is moved in the direction depicted by the arrow F together with the optical fiber preform 9. When the optical fiber preform 9 is sequentially moved down in the direction depicted by the arrow F in accordance with the melt-drawing operation, the first compartment 410a arrives at the other portion of the sealing device 41. In this stage, the first compartment 410a is fixed, so that the sealing device 41 (the second compartment 410b) is formed, and the sealing device interior 410 is sealed from the external air.

When the first compartment 410a is fixed, it is desirable that the inert gas flows between the first seal member 411 and the second seal member 412. With such a configuration, the second compartment 410b is filled with the inert gas while the external air is prevented from intruding thereinto, thereby more excellently preventing the external air from intruding into the heating furnace interior 100.

Further, it is desirable that the distance between the first seal member 411 and the second seal member 412 is set to be small so that the volume of the second compartment 410b decreases. Further, the facing surfaces of the first seal member 411 and the second seal member 412 may partly or entirely contact each other. With such a configuration, the external air is further prevented from intruding into the second compartment 410b. Then, even at this time, it is desirable that the inert gas flows between the first seal member 411 and the second seal member 412.

The manufacturing apparatus 4 in which the optical fiber preform 9 is set by fixing the first compartment 410a thereto is maintained in the same state as that of the manufacturing apparatus 3 shown in FIG. 9. Accordingly, from this stage, the optical fiber may be manufactured in the same manner as the case of the manufacturing apparatus 3.

In the manufacturing apparatus 4, since the first compartment 410a is adapted to be attachable or detachable, the contraction portion 9b may be more easily sealed compared to the case of the manufacturing apparatus 3. Further, since the volume of the first compartment 410a may be decreased, the sealing device 41 may be formed in a small size.

While the present invention has been described in detail so far, for example, a part of the configuration of the manufacturing apparatus of the present invention may be omitted, added, or modified within the scope in which the effect of the present invention is not disturbed.

According to the present invention, in the optical fiber manufacturing process, it is possible to prevent external air from intruding into the heating furnace and to prevent a large variation in the local stream of the gas inside the heating furnace. As a result, it is possible to prevent a variation in the outer diameter of the optical fiber, to prevent a deterioration of a carbon-based member inside the heating furnace, and to prevent a degradation of the strength of the optical fiber. Further, the large optical fiber preform or the high-speed fiber drawing speed may be handled.

EXAMPLES

Hereinafter, specific examples will be described in more detail. However, the present invention is not limited to the examples to be described below.

Example 1

An optical fiber was manufactured by using the manufacturing apparatus 1 shown in FIG. 1. The manufacturing condition is shown in Table 1. The specific condition is as follows.

In the manufacturing apparatus used herein, the sealing device includes the first to third seal members (three seal members), and the distances ($L_{b1}$ and $L_{c1}$) between the adjacent seal members are all 60 mm. Further, in all three seal members, the thickness of three stacked carbon sheets is 0.6 mm. In the carbon sheet, the diameters ($D_{111}$ and the like) of the holes as the insertion portions of the optical fiber preform are 152 mm, and seventy two cleaved portions are provided at the substantially same interval.

The first and second pipes are branched from one main pipe. In the first and second pipes, the inner diameters and the lengths are equal to each other.

The dummy portion was manufactured in a manner such that the dummy member having an outer diameter of 155 mm and a length of 800 mm was flame-welded to the end portion of the optical fiber preform (the body portion) having an outer diameter of 155 mm and a length of 1500 mm. As a result, a contraction portion was formed at the boundary area between the dummy portion and the body portion of the optical fiber preform due to a flame of a burner in the welding operation, where the outer diameter of the contraction portion was smaller than that of the body portion such as to be 154 mm or less. The length of the contraction portion in the longitudinal direction of the optical fiber preform was 50 mm.

Helium as an inert gas was made to flow into the third compartment of the sealing device and the heating furnace interior. At this time, the total sum of the flow rates was 5 L/minute. Then, the optical fiber preform was set in the manufacturing apparatus, the temperature of the heater of the heating furnace was increased, and then the melt-drawing operation was performed at the line speed of 1000 m/minute. The concentration of oxygen at the upper portion of the heating furnace interior, the quality of the optical fiber, and the state of the carbon-based member are shown in Table 1.

Example 2, Example 3, Comparative Example 1, Comparative Example 2, and Comparative Example 3

The optical fiber was manufactured in the same manner as that of Example 1 except that the manufacturing condition was set as shown in Table 1. The concentration of oxygen at the upper portion of the heating furnace interior, the quality of the optical fiber, and the state of the carbon-based member are shown in Table 1.

Example 2 is the same as Example 1 except that the distances ($L_{b1}$ and $L_{c1}$) between the adjacent seal members are all 80 mm, and the length of the contraction portion of the optical fiber preform is 50 mm.

Example 3 is the same as Example 1 except that the sealing device includes first to fourth seal members (four seal members), the distances ($L_{b1}$ and $L_{c1}$) between the adjacent seal members are all 100 mm, and the length of the contraction portion of the optical fiber preform is 60 mm.

Comparative Example 1 is the same as Example 1 except that the distances ($L_{b1}$ and $L_{c1}$) between the adjacent seal members are all 60 mm, and the length of the contraction portion of the optical fiber preform is 80 mm.

Comparative Example 2 is the same as Example 1 except that the sealing device includes only the first seal member (one seal member), and the pipe of the inert gas is only the first pipe.

Comparative Example 3 is the same as Example 1 except that the sealing device includes only the first and second seal members (two seal members), and the pipe of the inert gas is only the first pipe.

TABLE 1

|  | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 |
| --- | --- | --- | --- | --- | --- | --- |
| NUMBER OF SEAL MEMBERS (NUMBER OF COMPARTMENTS OF SEALING DEVICE) | 3 | 3 | 4 | 3 | 1 | 2 |
| DISTANCE BETWEEN SEAL MEMBERS (mm) | 60 | 80 | 100 | 60 | — | 60 |
| LENGTH OF CONTRACTION PORTION (mm) | 50 | 40 | 60 | 80 | 50 | 50 |
| PIPE OF INERT GAS | TWO BRANCHES | TWO BRANCHES | TWO BRANCHES | TWO BRANCHES | ONE AT UPPER PORTION OF HEATING FURNACE INTERIOR | ONE AT UPPER PORTION OF HEATING FURNACE INTERIOR |
| TOTAL SUM OF FLOW RATES OF INERT GASES (L/MINUTE) | 5 | 5 | 5 | 5 | 5 | 5 |
| MAXIMUM VALUE OF CONCENTRATION OF OXYGEN AT UPPER PORTION OF HEATING FURNACE INTERIOR (ppm) | 80 | 80 | 80 | 80 | 500 | 300 |
| MAXIMUM VALUE OF VARIATION IN OUTER DIAMETER OF OPTICAL FIBER (μm) | 125 ± 0.1 | 125 ± 0.1 | 125 ± 0.1 | 125 ± 0.5 | 125 ± 0.7 | 125 ± 0.6 |
| MAXIMUM VALUE OF VARIATION IN OUTER DIAMETER OF NORMAL OPTICAL FIBER (μm) | 125 ± 0.1 | 125 ± 0.1 | 125 ± 0.1 | 125 ± 0.1 | 125 ± 0.3 | 125 ± 0.3 |
| BREAKAGE OF OPTICAL FIBER | NO | NO | NO | NO | YES | NO |
| DETERIORATION DEGREE OF CARBON-BASED MEMBER | SMALL | SMALL | SMALL | SMALL | LARGE | MEDIUM |
| FINAL DETERMINATION | Good | Good | Good | Poor | Poor | Poor |

In Example 1 to Example 3, the concentration of oxygen at the upper portion (the vicinity of the opening portion) inside the heating furnace was measured in the optical fiber manufacturing process. As a result, in any case, the concentration of oxygen was stable such as to be greater than or equal to 50 ppm and less than or equal to 80 ppm, and the external air was sufficiently prevented from intruding into the heating furnace. Further, the optical fiber was not broken during the melt-drawing operation, and the outer diameter of the optical fiber was constant such as to be 125±0.1 μm, so that a variation in the outer diameter was prevented. Accordingly, there was no variation in the local stream of the gas in the heating furnace interior. Likewise, the optical fiber with satisfactory quality was manufactured. Further, deterioration was hardly found as a result of visibly observing the appearance of the carbon-based member in the heating furnace, and the state thereof was satisfactory.

This result was obtained because the inert gas was made to flow into a space (a closed space) not opened to the outside of the sealing device, and the optical fiber preform was moved so that the contraction portion did not simultaneously meet all compartments of the sealing device. Accordingly, the external air was prevented from intruding into the heating furnace interior, and a variation in the local stream of the gas in the heating furnace interior was prevented.

On the contrary, in Comparative Example 1, the degree of a variation in the outer diameter of the optical fiber was large. Here, the distance ($L_{b1}$) between the adjacent seal members is 60 mm, and is shorter than the length (80 mm) of the contraction portion of the optical fiber preform. For this reason, the contraction portion may simultaneously meet all compartments of the sealing device during the movement of the optical fiber preform. At this time, the third compartment of the sealing device becomes a space (an opened space) opened to the outside of the sealing device, and a variation in the flow rate of the inert gas at the upper portion of the heating furnace interior is large. As a result, the stream of the gas in the heating furnace interior locally changed greatly. This was because the degree of a variation in the outer diameter of the optical fiber was large.

In Comparative Example 2, the optical fiber was broken, and the degree of a variation in the outer diameter of the optical fiber was large. Further, the concentration of oxygen at the upper portion of the heating furnace interior was extremely high, and the carbon-based member in the heating furnace deteriorated.

This was because the compartment inside the sealing device was only the first compartment. Accordingly, the sealing performance was low, and the external air intruded into the heating furnace interior, so that the concentration of oxygen increased and the stream of the gas locally changed greatly.

In Comparative Example 3, the optical fiber was not broken, but the degree of a variation in the outer diameter of the optical fiber was locally great. Further, the concentration of oxygen at the upper portion of the heating furnace interior temporarily increased, so that the carbon-based member in the heating furnace deteriorated. However, the degree of deterioration was larger than those of Example 1 to Example 3, but was smaller than that of Comparative Example 1. That is, the degree of deterioration was medium. This was because the sealing performance of the sealing device was not extremely degraded as in the case of Comparative Example 1, but the external air present between the seal members temporarily intruded into the upper portion of the heating furnace interior. Accordingly, the concentration of oxygen temporarily increased, and the stream of the gas locally changed greatly.

Example 4

The optical fiber was manufactured by using the manufacturing apparatus 2 shown in FIG. 5. The manufacturing condition is shown in Table 2. The specific condition is as follows.

In the manufacturing apparatus used herein, the sealing device includes the first to third seal members (three seal members), and the distance ($L_{a1}$) from the upper opening portion of the seal device to the first seal member and the distances ($L_{b1}$ and $L_{c1}$) (indicated as "distance between seal members" in Table 2) between the adjacent seal members are all 60 mm. Further, in all three seal members, the thickness of three stacked carbon sheets is 0.6 mm. In the carbon sheet, the diameters ($D_{111}$ and the like) of the holes as the insertion portions of the optical fiber preform are 152 mm, and seventy two cleaved portions are provided at the substantially same interval. The first and second pipes are branched from one main pipe. The inner diameter of the first pipe is equal to the inner diameter of the second pipe. The length of the second pipe is twice the length of the first pipe.

As the optical fiber preform (the body portion) having an outer diameter of 155 mm and a length of 1500 mm, used was an optical fiber preform having a tapered shape. Here, the tapered shape is designed such that the outer diameter gradually decreases from the position close to the end portion to have the end portion with an outer diameter of 50 mm. The dummy portion was manufactured in a manner such that the dummy member having an outer diameter of 50 mm and a length of 800 mm was flame-welded to the end portion of the optical fiber preform. The tapered portion corresponds to the boundary area.

Subsequently, an adapter having a length of 130 mm was attached to a part of the tapered portion. At this time, in the longitudinal direction of the optical fiber preform, the length of the contraction portion as the portion provided with the step between the adapter and the exposed tapered portion was 30 mm.

Helium as an inert gas was made to flow into the third compartment of the sealing device and the heating furnace interior. At this time, the total sum of the flow rates of the gases was 5 L/minute. Then, the optical fiber preform having the adapter attached thereto was set in the manufacturing apparatus, the temperature of the heater of the heating furnace was increased, and the optical fiber preform was moved down together with the adapter. Subsequently, only the optical fiber preform was further moved down, thereby performing the melt-drawing operation at the line speed of 1200 m/minute. The concentration of oxygen at the upper portion of the heating furnace interior, the quality of the optical fiber, and the state of the carbon-based member are shown in Table 2.

Example 5, Comparative Example 4, Comparative Example 5, and Comparative Example 6

The optical fiber was manufactured in the same manner as that of Example 4 except that the manufacturing condition was set as shown in Table 2. The concentration of oxygen at the upper portion of the heating furnace interior, the quality of the optical fiber, and the state of the carbon-based member are shown in Table 2.

Example 5 is the same as Example 4 except that the distance ($L_{a1}$) from the upper opening portion of the sealing device to the first seal member and the distances ($L_{b1}$ and $L_{c1}$) between the adjacent seal members are all 50 mm, and the length of the contraction portion of the optical fiber preform is 40 mm.

Comparative Example 4 is the same as Example 4 except that the distance ($L_{a1}$) from the upper opening portion of the sealing device to the first seal member and the distances ($L_{b1}$ and $L_{c1}$) between the adjacent seal members are all 30 mm, the length of the contraction portion of the optical fiber preform is 40 mm, and the length of the adapter is 130 mm.

Comparative Example 5 is the same as Example 4 except that the distance ($L_{a1}$) from the upper opening portion of the sealing device to the first seal member and the distances ($L_{b1}$ and $L_{c1}$) between the adjacent seal members are all 60 mm, the length of the contraction portion of the optical fiber preform is 30 mm, and the length of the adapter is 70 mm.

Comparative Example 6 is the same as Example 4 except that the sealing device includes the first and second seal members (two seal members), the pipe of the inert gas is only the first pipe, and the length of the adapter is 70 mm.

TABLE 2

| | EXAMPLE 4 | EXAMPLE 5 | COMPARATIVE EXAMPLE 4 | COMPARATIVE EXAMPLE 5 | COMPARATIVE EXAMPLE 6 |
|---|---|---|---|---|---|
| NUMBER OF SEAL MEMBERS (NUMBER OF COMPARTMENTS OF SEALING DEVICE) | 3 | 3 | 3 | 3 | 2 |
| DISTANCE BETWEEN SEAL MEMBERS (mm) | 60 | 50 | 30 | 60 | 60 |
| LENGTH OF CONTRACTION PORTION (mm) | 30 | 40 | 40 | 30 | 30 |
| LENGTH OF ADAPTER (mm) | 130 | 130 | 100 | 70 | 70 |
| PIPE OF INERT GAS | TWO BRANCHES | TWO BRANCHES | TWO BRANCHES | TWO BRANCHES | ONE AT UPPER PORTION OF HEATING FURNACE INTERIOR |
| TOTAL SUM OF FLOW RATES OF INERT GASES (L/MINUTE) | 5 | 5 | 5 | 5 | 5 |
| MAXIMUM VALUE OF CONCENTRATION OF OXYGEN AT UPPER PORTION OF HEATING FURNACE INTERIOR (ppm) | 80 | 80 | 80 | 90 | 100 |
| MAXIMUM VALUE OF VARIATION IN OUTER DIAMETER OF OPTICAL FIBER (μm) | 125 ± 0.1 | 125 ± 0.1 | 125 ± 0.5 | 125 ± 0.6 | 125 ± 0.6 |
| MAXIMUM VALUE OF VARIATION IN OUTER DIAMETER OF NORMAL OPTICAL FIBER (μm) | 125 ± 0.1 | 125 ± 0.1 | 125 ± 0.1 | 125 ± 0.1 | 125 ± 0.1 |
| BREAKAGE OF OPTICAL FIBER | NO | NO | NO | NO | NO |
| DETERIORATION DEGREE OF CARBON-BASED MEMBER | SMALL | SMALL | SMALL | MEDIUM | MEDIUM |
| FINAL DETERMINATION | Good | Good | Poor | Poor | Poor |

In Example 4 and Example 5, the concentration of oxygen at the upper portion (the vicinity of the opening portion) inside the heating furnace was measured in the optical fiber manufacturing process. As a result, in any case, the concentration of oxygen was stable such as to be greater than or equal to 50 ppm and less than or equal to 80 ppm, and the external air was sufficiently prevented from intruding into the heating furnace. Further, the optical fiber was not broken during the melt-drawing operation, and the outer diameter of the optical fiber was constant such as to be 125±0.1 μm, so that a variation in the outer diameter was prevented and no variation in the local stream of the gas inside the heating furnace occurred. Likewise, the optical fiber with satisfactory quality was manufactured. Further, deterioration was hardly found as a result of visibly observing the appearance of the carbon-based member in the heating furnace, and the state thereof was satisfactory.

Here, when the inert gas was made to flow into a space (a closed space) not opened to the outside of the sealing device, and the upper opening portion of the sealing device was blocked by the flange portion of the adapter, the contraction portion was controlled so as not to simultaneously meet the position from the third compartment to the second compartment. Accordingly, the external air was prevented from intruding into the heating furnace interior, and a variation in the local stream of the gas in the heating furnace interior was prevented. The result was obtained due to the following reason. The value of the length of the adapter was larger than the sum of the distance ($L_{a1}$) from the upper opening portion of the sealing device to the first seal member, the distance ($L_{b1}$) between the adjacent seal members, and the thickness of the first seal member. For this reason, as shown in FIG. 6B, at the stage in which the flange portion of the adapter come into contact with the sealing device, the contraction portion arrived at the third compartment.

On the contrary, in Comparative Example 4, the degree of a variation in the outer diameter of the optical fiber was large. This was because the distance ($L_{b1}$) between the adjacent seal members was 30 mm and was shorter than the length (40 mm) of the contraction portion of the optical fiber preform. That is, before the flange portion of the adapter comes into close contact with the upper opening portion of the sealing device to block the upper opening, the contraction portion may simultaneously meet all compartments of the sealing device. At this time, the third compartment of the sealing device becomes a space (an opened space) opened to the outside of the sealing device. For this reason, a variation in the flow rate of the inert gas at the upper portion of the heating furnace interior was large, and the stream of the gas in the heating furnace interior locally changed greatly.

In Comparative Example 5, the degree of a variation in the outer diameter of the optical fiber was large, the concentration of oxygen at the upper portion of the heating furnace interior was slightly high, and the carbon-based member in the heating furnace deteriorated. However, the degree of deterioration was medium. This was because the length of the adapter was short. That is, at the stage in which the flange portion of the adapter comes into close contact with the upper opening portion of the sealing device so as to block the upper opening, the opening end of the attachment portion of adapter is present at the second compartment. For this reason, at the stage in which only the optical fiber preform is further moved down, the contraction portion may be enlarged, so that the contraction portion simultaneously meets the second compartment, the third compartment, and the heating furnace interior. At this time, the external air intruding into the second compartment temporarily intrudes into the upper portion of the heating furnace interior, so that the concentration of oxygen temporarily increases and the stream of the gas locally changes greatly.

In Comparative Example 6, the degree of a variation in the outer diameter of the optical fiber was large, the concentration of oxygen at the upper portion of the heating furnace interior was higher than that of Comparative Example 5, and the carbon-based member in the heating furnace deteriorated. However, the degree of deterioration was medium. Here, even when the length of the adapter is short as in Comparative Example 5 and the pipe of the inert gas is only the first pipe, the external air temporarily intrudes into the upper portion of the heating furnace interior as in Comparative Example 5. For this reason, the concentration of oxygen temporarily increases, and the stream of the gas locally changes greatly.

Example 6

The optical fiber was manufactured by using the manufacturing apparatus 4 shown in FIG. 10. The manufacturing condition is shown in Table 3. The specific condition is as follows.

In the manufacturing apparatus used herein, the first compartment is attachable to or detachable from the other portion of the sealing device. Further, the sealing device includes the first to third seal members (three seal members). The distance ($L_{b1}$) between the second and third seal members is 60 mm.

Further, in all three seal members, the thickness of three stacked carbon sheets is 0.6 mm. In the carbon sheet, the diameters ($D_{111}$ and the like) of the holes as the insertion portions of the optical fiber preform are 152 mm, and seventy two cleaved portions are provided at the substantially same interval. The first to third pipes are branched from one main pipe. The inner diameters of the first to third pipes are equal to each other. The lengths of the second and third pipes are 0.5 times the length of the first pipe.

As the optical fiber preform (the body portion) having an outer diameter of 155 mm and a length of 1500 mm, used was an optical fiber preform having a tapered shape. Here, the tapered shape is designed such that the outer diameter gradually decreases from the position close to the end portion to have the end portion with an outer diameter of 50 mm. The dummy portion was manufactured in a manner such that the dummy member having an outer diameter of 50 mm and a length of 800 mm was flame-welded to the end portion of the optical fiber preform.

Helium as an inert gas was made to flow into the first and third compartments of the sealing device and the heating furnace interior. At this time, the total sum of the flow rates of the gases was 5 L/minute. Then, the first compartment was separated from the other portion of the sealing device. In this state, the opening portion located at the upstream of the first compartment come into close contact with the outer peripheral surface of the dummy portion, and the first seal member come into close contact with the body portion, so that the contraction portion was disposed at the first compartment. Then, the exposed portion of the body portion of the optical fiber preform was inserted through the sealing device interior and the heating furnace interior, so that the optical fiber preform was set in the manufacturing apparatus.

Subsequently, the temperature of the heater of the heating furnace was increased, the first compartment was moved down together with the optical fiber preform, and the first compartment was fixed to the other portion of the sealing device. Subsequently, only the optical fiber preform was further moved down, thereby performing the melt-drawing operation at the line speed of 1500 m/minute. The concentration of oxygen at the upper portion of the heating furnace interior, the quality of the optical fiber, and the state of the carbon-based member are shown in Table 3.

Comparative Example 7

The optical fiber was manufactured in the same manner as that of Example 6 except that the manufacturing condition was set as shown in Table 3. Specifically, Comparative Example 7 is the same as Example 6 except that the first seal member and the third pipe are not provided. The concentration of oxygen at the upper portion of the heating furnace interior, the quality of the optical fiber, and the state of the carbon-based member are shown in Table 3.

TABLE 3

|  | EXAMPLE 6 | COMPARATIVE EXAMPLE 7 |
| --- | --- | --- |
| NUMBER OF SEAL MEMBERS (NUMBER OF COMPARTMENTS OF SEALING DEVICE) | 3 | 2 |
| DISTANCE BETWEEN SEAL MEMBERS (mm) | 60 | 60 |
| PIPE OF INERT GAS | THREE BRANCHES | TWO BRANCHES |
| TOTAL SUM OF FLOW RATES OF INERT GASES (L/MINUTE) | 5 | 5 |
| MAXIMUM VALUE OF CONCENTRATION OF OXYGEN AT UPPER PORTION OF HEATING FURNACE INTERIOR (ppm) | 80 | 300 |
| MAXIMUM VALUE OF VARIATION IN OUTER DIAMETER OF OPTICAL | 125 ± 0.1 | 125 ± 0.6 |

TABLE 3-continued

|  | EXAMPLE 6 | COMPARATIVE EXAMPLE 7 |
|---|---|---|
| FIBER (μm) |  |  |
| MAXIMUM VALUE OF VARIATION IN OUTER DIAMETER OF NORMAL OPTICAL FIBER (μm) | 125 ± 0.1 | 125 ± 0.1 |
| BREAKAGE OF OPTICAL FIBER | NO | NO |
| DETERIORATION DEGREE OF CARBON-BASED MEMBER | SMALL | MEDIUM |
| FINAL DETERMINATION | Good | Poor |

In Example 6, the concentration of oxygen at the upper portion (the vicinity of the opening portion) inside the heating furnace was measured in the optical fiber manufacturing process. As a result, the concentration of oxygen was stable such as to be greater than or equal to 50 ppm and less than or equal to 80 ppm, and the external air was sufficiently prevented from intruding into the heating furnace. Further, the optical fiber was not broken during the melt-drawing operation, and the outer diameter of the optical fiber was constant such as to be 125±0.1 μm, so that a variation in the outer diameter was prevented and no variation in the local stream of the gas inside the heating furnace occurred. Likewise, the optical fiber with satisfactory quality was manufactured. Further, deterioration was hardly found as a result of visibly observing the appearance of the carbon-based member in the heating furnace, and the state thereof was satisfactory.

The result was obtained because the inert gas was made to flow into a space (a closed space) not opened to the outside of the sealing device, and the optical fiber preform was moved, so that the external air was prevented from intruding into the heating furnace interior, and a variation in the local stream of the gas in the heating furnace interior was prevented.

On the contrary, in Comparative Example 7, the degree of a variation in the outer diameter of the optical fiber was large. After the first compartment was fixed to the other portion of the sealing device, only the optical fiber preform was further moved down. In this time, by communicating from the first compartment to the heating furnace interior, the external air present in the first compartment temporarily intruded into the upper portion of the heating furnace interior. Accordingly, the concentration of oxygen temporarily increased, and the stream of the gas locally changed greatly. For this reason, the degree of a variation in the outer diameter of the optical fiber was large.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical fiber manufacturing method using an optical fiber manufacturing apparatus including a heating furnace in which an optical fiber is formed by melt-drawing an optical fiber preform having a dummy portion provided at an end portion thereof while the optical fiber preform is moved in a longitudinal direction thereof, and a sealing mechanism which is provided on an opening portion located at an upstream of the heating furnace, includes three or more seal members contacting an outer peripheral surface of the optical fiber preform and dividing an internal space into three or more compartments along the longitudinal direction of the optical fiber preform, and seals the heating furnace with an inert gas by preventing external air from intruding into the heating furnace while the optical fiber preform is inserted through the heating furnace, the optical fiber manufacturing method comprising:

preparing an optical fiber preform having a dummy portion with a contraction portion having an outer diameter reduced more than that of a body and a changing reduction width;

supplying an inert gas to a lowermost compartment closest to the heating furnace among the compartments and into the heating furnace;

controlling a total sum of flow rates of the supplied inert gases to be substantially constant; and moving the optical fiber preform so that the contraction portion does not simultaneously meet all compartments from an uppermost compartment farthest from the heating furnace among the compartments to the lowermost compartment, wherein a distance between adjacent seal members is set to be greater than a length of the contraction portion in the longitudinal direction of the optical fiber preform.

2. The optical fiber manufacturing method according to claim 1, wherein at least a part of the contraction portion is sealed by attaching a substantially cylindrical adapter to the optical fiber preform to cover the contraction portion, the adapter including a first opening portion provided at an upstream to come into close contact with an outer peripheral surface of the dummy portion and a second opening portion provided at a downstream to come into close contact with the contraction portion, wherein an outer diameter of an attachment portion of the adapter is substantially equal to an outer diameter of the optical fiber preform, and wherein the optical fiber preform is moved so that a non-attachment portion of the adapter in the contraction portion does not simultaneously meet all compartments from the uppermost compartment to the lowermost compartment.

3. The optical fiber manufacturing method according to claim 2, wherein the adapter includes a flange portion provided at one end thereof, wherein the flange portion is provided with an opening portion located at the upstream, wherein the flange portion covers and blocks an upper opening portion of the sealing mechanism while the optical fiber preform is inserted through the adapter, and wherein when the optical fiber preform having the adapter attached thereto is moved to block the upper opening portion of the sealing mechanism, the optical fiber preform is further moved so that a non-attachment portion of the adapter in the contraction portion does not simultaneously meet the lowermost compartment and the compartment thereabove.

4. An optical fiber manufacturing method using an optical fiber manufacturing apparatus including a heating furnace in which an optical fiber is formed by melt-drawing an optical fiber preform having a dummy portion provided at an end portion thereof while the optical fiber preform is moved in a longitudinal direction thereof, and a sealing mechanism which is provided on an opening portion located at an upstream of the heating furnace, includes two or more seal members contacting an outer peripheral surface of the optical fiber preform and dividing an internal space into two or more compartments along the longitudinal direction of the optical fiber preform, and seals the heating furnace with an inert gas by preventing external air from intruding into the heating furnace while the optical fiber preform is inserted through the heating furnace, the optical fiber manufacturing method comprising:

preparing an optical fiber preform having a dummy portion with a contraction portion having an outer diameter reduced more than that of a body and a changing reduction width; and supplying an inert gas to a lowermost compartment closest to the heating furnace among the compartments and into the heating furnace and an uppermost compartment among the compartments having an opening portion provided at the upstream to come into close contact with an outer peripheral surface of the dummy portion and sealing the contraction portion when the optical fiber preform is inserted therethrough, and moving the optical fiber preform while controlling a total sum of flow rates of the inert gases to be substantially constant, wherein a distance between adjacent seal members is set to be greater than a length of the contraction portion in the longitudinal direction of the optical fiber preform.

5. The optical fiber manufacturing method according to claim 4, wherein the sealing mechanism includes three or more seal members which divide an internal space thereof into three or more compartments, wherein the uppermost compartment is independently attachable to or detachable from a portion of the sealing mechanism and is movable along the longitudinal direction of the optical fiber preform by a driving device, and wherein when a fiber drawing operation is performed, the contraction portion and the body are disposed such that the contraction portion is disposed at the uppermost compartment and the body of the optical fiber preform is disposed inside the heating furnace while the uppermost compartment is separated from a portion of the sealing mechanism, the uppermost compartment is moved together with the optical fiber preform to be fixed to the other portion of the sealing mechanism, and then the optical fiber preform is further moved.

* * * * *